(12) United States Patent
Neishi et al.

(10) Patent No.: US 11,965,231 B2
(45) Date of Patent: Apr. 23, 2024

(54) STEEL MATERIAL TO BE STARTING MATERIAL OF CARBONITRIDED BEARING COMPONENT

(71) Applicants: NIPPON STEEL CORPORATION, Tokyo (JP); JTEKT CORPORATION, Osaka (JP)

(72) Inventors: Yutaka Neishi, Tokyo (JP); Tomohiro Yamashita, Tokyo (JP); Daisuke Hirakami, Tokyo (JP); Takahisa Suzuki, Tokyo (JP); Tatsuya Koyama, Tokyo (JP); Takashi Sada, Kashiwara (JP); Kohei Kanetani, Kashiba (JP)

(73) Assignees: NIPPON STEEL CORPORATION, Tokyo (JP); JTEKT CORPORATION, Osaka (JP)

( * ) Notice: Subject to any disclaimer, the term of this patent is extended or adjusted under 35 U.S.C. 154(b) by 513 days.

(21) Appl. No.: 17/417,735

(22) PCT Filed: Dec. 27, 2019

(86) PCT No.: PCT/JP2019/051503
§ 371 (c)(1),
(2) Date: Jun. 23, 2021

(87) PCT Pub. No.: WO2020/138450
PCT Pub. Date: Jul. 2, 2020

(65) Prior Publication Data
US 2022/0074032 A1   Mar. 10, 2022

(30) Foreign Application Priority Data
Dec. 27, 2018 (JP) .................................. 2018-245699

(51) Int. Cl.
*C22C 38/46* (2006.01)
*C22C 38/00* (2006.01)
(Continued)

(52) U.S. Cl.
CPC ............ *C22C 38/46* (2013.01); *C22C 38/001* (2013.01); *C22C 38/002* (2013.01); *C22C 38/02* (2013.01);
(Continued)

(58) Field of Classification Search
None
See application file for complete search history.

(56) References Cited

U.S. PATENT DOCUMENTS

| | | | |
|---|---|---|---|
| 5,660,647 A | 8/1997 | Mitamura et al. | |
| 2017/0218489 A1 | 8/2017 | Neishi et al. | |
| 2019/0002999 A1* | 1/2019 | Miyanishi | ............... C22C 38/46 |

FOREIGN PATENT DOCUMENTS

| | | |
|---|---|---|
| DE | 69718784 T2 | 3/2003 |
| DE | 69718784 T2 | 12/2003 |

(Continued)

OTHER PUBLICATIONS

Machine translation of JP2008-280583A. (Year: 2008).*

*Primary Examiner* — Xiaowei Su
(74) *Attorney, Agent, or Firm* — Greer Burns & Crain Ltd.

(57) ABSTRACT

The steel material includes a chemical composition containing, in mass %, C: 0.15 to 0.45%, Si: 0.50% or less, Mn: 0.20 to 0.60%, P: 0.015% or less, S: 0.005% or less, Cr: 0.80 to 1.50%, Mo: 0.17 to 0.30%, V: 0.24 to 0.40%, Al: 0.005 to 0.100%, N: 0.0300% or less, O: 0.0015% or less, and the balance being Fe and impurities, and satisfying Formula (1) to Formula (4) described in Embodiment, wherein, in its microstructure, a total area fraction of ferrite and pearlite is 10.0% or more, and a proportion of a content of V (mass %) in electrolytic extraction residue to the content of V (mass %) in the chemical composition is 10.0% or less.

4 Claims, 3 Drawing Sheets

(51) Int. Cl.
*C22C 38/02* (2006.01)
*C22C 38/04* (2006.01)
*C22C 38/06* (2006.01)
*C22C 38/20* (2006.01)
*C22C 38/26* (2006.01)
*C22C 38/28* (2006.01)
*C22C 38/32* (2006.01)
*C22C 38/44* (2006.01)

(52) U.S. Cl.
CPC .............. *C22C 38/04* (2013.01); *C22C 38/06* (2013.01); *C22C 38/20* (2013.01); *C22C 38/26* (2013.01); *C22C 38/28* (2013.01); *C22C 38/32* (2013.01); *C22C 38/44* (2013.01)

(56) References Cited

FOREIGN PATENT DOCUMENTS

| | | | | |
|---|---|---|---|---|
| EP | 903418 B1 | | 1/2003 | |
| JP | 08049057 A | | 2/1996 | |
| JP | 11012684 A | | 1/1999 | |
| JP | 2008280583 A | * | 11/2008 | |
| WO | 2016017162 A1 | | 2/2016 | |
| WO | WO-2017115842 A1 | * | 7/2017 | ............... C21D 8/06 |

\* cited by examiner

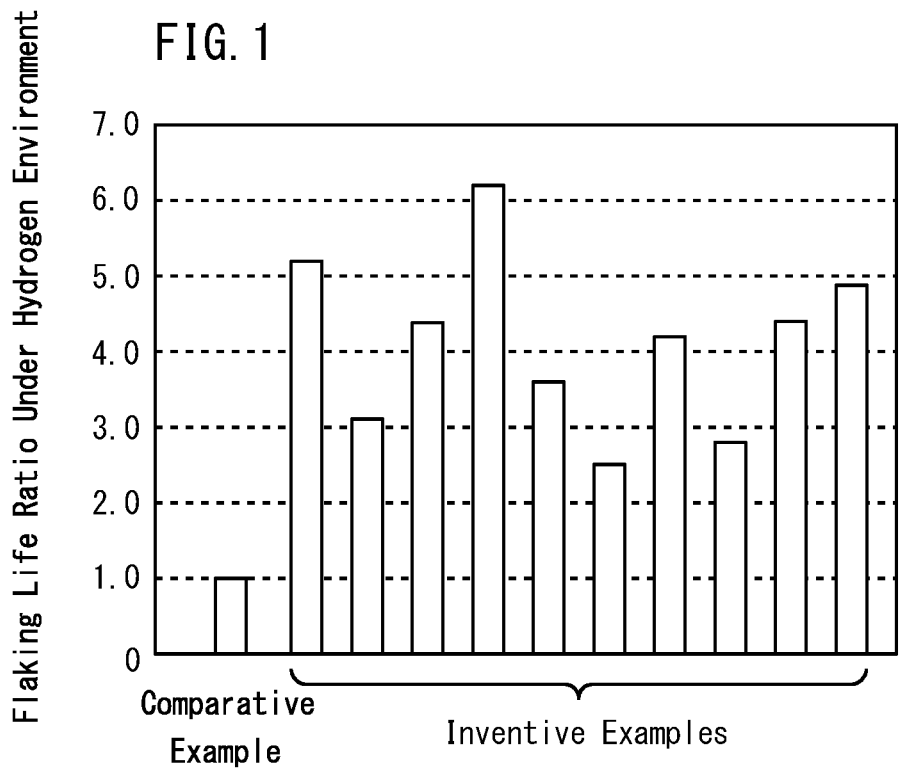
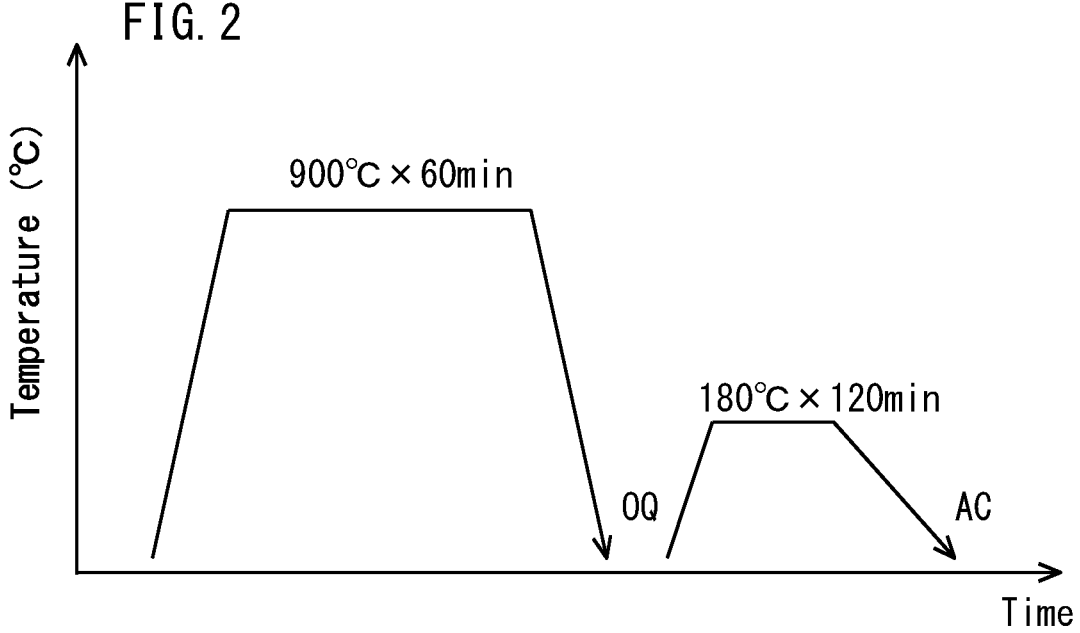

STEEL MATERIAL TO BE STARTING MATERIAL OF CARBONITRIDED BEARING COMPONENT

This is a National Phase Application filed under 35 U.S.C. § 371, of International Application No. PCT/JP2019/051503, filed Dec. 27, 2019, the contents of which are incorporated by reference.

TECHNICAL FIELD

The present disclosure relates to a steel material, more specifically to a steel material to be a starting material of a carbonitrided bearing component, which is a bearing component subjected to carbonitriding treatment.

BACKGROUND ART

Steel materials to be a starting material of a bearing component are typified by SUJ2 specified in JIS G 4805 (2008). These kinds of steel materials are produced into a bearing component by the following method. Hot forging and/or cutting machining is performed on a steel material to produce an intermediate product having a desired shape. Heat treatment is performed on the intermediate product to adjust a hardness of the steel material and formulate a microstructure of the steel material. Examples of the heat treatment include quenching and tempering, carburizing treatment, and carbonitriding treatment. Through the above processes, a bearing component having desired bearing performances (wear resistance and a toughness of a core portion of the bearing component) is produced.

As the heat treatment described above, carbonitriding treatment is performed in a case where wear resistance is particularly required as a bearing performance. Carbonitriding treatment herein means a treatment in which carbonitriding and quenching, and tempering are performed. In carbonitriding treatment, a carbonitrided layer is formed in an outer layer of a steel material, which hardens the outer layer of the steel material. A bearing component subjected to carbonitriding treatment will be herein referred to as carbonitrided bearing component.

Techniques for increasing a wear resistance, toughness, and the like of a bearing component are proposed in Japanese Patent Application Publication No. 8-49057 (Patent Literature 1), Japanese Patent Application Publication No. 11-12684 (Patent Literature 2), and International Application Publication No. 2016/017162 (Patent Literature 3).

A rolling bearing disclosed in Patent Literature 1 includes a race and a rolling element a starting material of at least one of which is a steel produced by making a medium-carbon or low-carbon low-alloy steel containing C: 0.1 to 0.7% by weight, Cr: 0.5 to 3.0% by weight, Mn: 0.3 to 1.2% by weight, Si: 0.3 to 1.5% by weight, and Mo: 3% by weight or less contain V: 0.8 to 2.0% by weight. A product formed from the starting material is subjected to carburizing treatment or carbonitriding treatment in heat treatment, so as to satisfy a relation in which a concentration of carbon of a surface of the product is 0.8 to 1.5% by weight and a concentration ratio V/C of the surface is 1 to 2.5. Patent Literature 1 describes that a wear resistance of the rolling bearing can be increased by causing V carbide to precipitate on a surface of the rolling bearing.

A case hardening steel to be cold forging disclosed in Patent Literature 2 has an area fraction of ferrite+pearlite of 75% or more, an average grain diameter of ferrite of 40 μm or less, and an average grain diameter of pearlite of 30 μm or less. Patent Literature 2 describes that inclusion of the above microstructure can increase a wear resistance of this case hardening steel to be cold forging.

A steel for carbonitrided bearing disclosed in Patent Literature 3 includes a chemical composition consisting of, in mass %, C: 0.22 to 0.45%, Si: 0.50% or less, Mn: 0.40 to 1.50%, P: 0.015% or less, S: 0.005% or less, Cr: 0.30 to 2.0%, Mo: 0.10 to 0.35%, V: 0.20 to 0.40%, Al: 0.005 to 0.10%, N: 0.030% or less, O: 0.0015% or less, B: 0 to 0.0050%, Nb: 0 to 0.10%, and Ti: 0 to 0.10%, with the balance being Fe and impurities, and satisfying Formula (1) and Formula (2). Here, Formula (1) is 1.20<0.4Cr+0.4Mo+4.5V<2.60, and Formula (2) is 2.7C+0.4Si+Mn+0.8Cr+Mo+V>2.20. Patent Literature 3 describes that this steel for carbonitrided bearing is excellent in hardenability despite not containing Ni, and after being subjected to heat treatment, the steel is excellent in toughness, wear resistance, and surface-initiated flaking life.

CITATION LIST

Patent Literature

Patent Literature 1: Japanese Patent Application Publication No. 8-49057
Patent Literature 2: Japanese Patent Application Publication No. 11-12684
Patent Literature 3: International Application Publication No. 2016/017162

SUMMARY OF INVENTION

Technical Problem

Bearing components are categorized into middle or large bearing components used for mining machinery or construction machinery and small bearing components used for automobiles. Examples of small bearing components include bearing components used in engines. Bearing components for automobiles are often used in environments in which lubricant such as engine oil circulates.

Recently, a viscosity of a lubricant is decreased to reduce frictional drag and transmission resistance, and a usage of lubricant to circulate is reduced, for improvement of fuel efficiency. As a result, lubricant in use is liable to decompose to generate hydrogen. In a case where hydrogen is generated in an environment in which a bearing component is used, hydrogen penetrates into the bearing component from the outside. The penetrating hydrogen causes a change in structure partly in a microstructure of the bearing component. The change in structure during use of the bearing component decreases a flaking life of the bearing component. Hereinafter, an environment in which hydrogen causing a change in structure is generated will be referred to as "hydrogen-generating environment" in the present specification.

Patent Literatures 1 to 3 described above have no discussions about a flaking life of a carbonitrided bearing component under a hydrogen-generating environment. In addition, in a case of a steel material to be a starting material of a carbonitrided bearing component, an intermediate product after hot forging in a process of producing a carbonitrided bearing component may be subjected to cutting machining for providing a final shape. In this case, the steel material to be a starting material of a carbonitrided bearing component is also required to have an excellent machinability.

An objective of the present disclosure is to provide a steel material to be a starting material of a carbonitrided bearing component that is excellent in machinability and is excellent in wear resistance, toughness of its core portion, and flaking life with a change in structure under a hydrogen-generating environment of the carbonitrided bearing component after carbonitriding treatment.

Solution to Problem

A steel material according to the present disclosure includes a chemical composition consisting of, in mass %:
C: 0.15 to 0.45%,
Si: 0.50% or less,
Mn: 0.20 to 0.60%,
P: 0.015% or less,
S: 0.005% or less,
Cr: 0.80 to 1.50%,
Mo: 0.17 to 0.30%,
V: 0.24 to 0.40%,
Al: 0.005 to 0.100%,
N: 0.0300% or less,
O: 0.0015% or less,
Cu: 0 to 0.20%,
Ni: 0 to 0.20%,
B: 0 to 0.0050%,
Nb: 0 to 0.100%,
Ti: 0 to 0.100%,
Ca: 0 to 0.0010%, and
the balance being Fe and impurities, and
satisfying Formula (1) to Formula (4),
wherein, in its microstructure, a total area fraction of ferrite and pearlite is 10.0% or more, and the balance is bainite, and
a proportion of a content of V (mass %) in electrolytic extraction residue to the content of V (mass %) in the chemical composition is 10.0% or less:

$$1.50 < 0.4Cr + 0.4Mo + 4.5V < 2.45 \quad (1)$$

$$2.20 < 2.7C + 0.4Si + Mn + 0.45Ni + 0.8Cr + Mo + V < 2.80 \quad (2)$$

$$Mo/V \geq 0.58 \quad (3)$$

$$(Mo+V+Cr)/(Mn+20P) \geq 2.40 \quad (4)$$

where each symbol of an element in Formula (1) to Formula (4) is to be substituted by a content of a corresponding element (mass %).

Advantageous Effect of Invention

The steel material according to the present disclosure is excellent in machinability and is excellent in wear resistance, toughness of its core portion, and flaking life with a change in structure under a hydrogen-generating environment after carbonitriding treatment.

BRIEF DESCRIPTION OF DRAWINGS

FIG. 1 is a graph illustrating flaking lives (Hr) under a hydrogen-generating environment of a bearing component (Comparative Example) made by performing quenching and tempering on a steel material equivalent to SUJ2 specified in JIS G 4805 (2008) and bearing components (carbonitrided bearing components: Inventive Examples of the present invention) each produced by performing carbonitriding treatment on a steel material according to the present embodiment, which has the chemical composition described above and satisfies Formula (1) to Formula (4) and in which a proportion of a content of V (mass %) in electrolytic extraction residue to a content of V (mass %) in the chemical composition is 10.0% or less.

FIG. 2 is a graph illustrating a heating pattern of quenching and tempering performed on test specimens for a hardenability evaluating test and a toughness evaluating test in EXAMPLE.

DESCRIPTION OF EMBODIMENT

Figure 3:
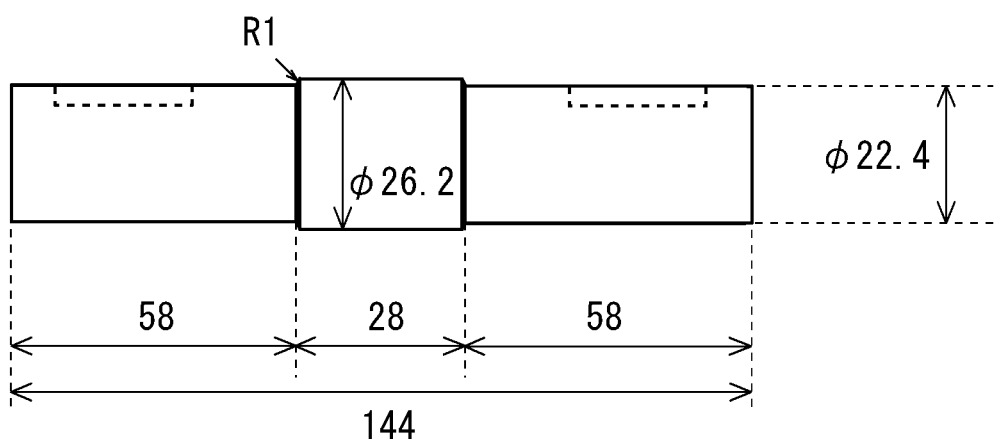
FIG. 3 is a side view of an intermediate product of a small roller specimen used in a roller-pitting test in EXAMPLE.

The present inventors conducted investigations and studies about a machinability of a steel material to be a starting material of a carbonitrided bearing component, and a wear resistance, a toughness of a core portion, and a flaking life with a change in structure under a hydrogen-generating environment of the carbonitrided bearing component after carbonitriding treatment.

First, the present inventors conducted studies about a chemical composition of a steel material that provides the properties described above. As a result, the present inventors considered that when a steel material is used that has a chemical composition consisting of, in mass %, C: 0.15 to 0.45%, Si: 0.50% or less, Mn: 0.20 to 0.60%, P: 0.015% or less, S: 0.005% or less, Cr: 0.80 to 1.50%, Mo: 0.17 to 0.30%, V: 0.24 to 0.40%, Al: 0.005 to 0.100%, N: 0.0300% or less, O: 0.0015% or less, Cu: 0 to 0.20%, Ni: 0 to 0.20%, B: 0 to 0.0050%, Nb: 0 to 0.100%, Ti: 0 to 0.100%, Ca: 0 to 0.0010%, and the balance being Fe and impurities, there is a possibility that a machinability of the steel material, and a wear resistance, a toughness of the core portion, and a flaking life with a change in structure under a hydrogen-generating environment of carbonitrided bearing component after carbonitriding treatment can be improved.

It was however revealed that a steel material in which elements simply fall within the respective ranges described above does not necessarily have the above-described properties improved (the machinability, and the wear resistance, the toughness of its core portion, and the flaking life under the hydrogen-generating environment of its carbonitrided bearing component). Hence, the present inventors conducted further studies. As a result, the present inventors found that the above-described properties can be increased when the above-described chemical composition of the core portion additionally satisfies the following Formula (1) to Formula (4):

$$1.50 < 0.4Cr + 0.4Mo + 4.5V < 2.45 \quad (1)$$

$$2.20 < 2.7C + 0.4Si + Mn + 0.45Ni + 0.8Cr + Mo + V < 2.80 \quad (2)$$

$$Mo/V \geq 0.58 \quad (3)$$

$$(Mo+V+Cr)/(Mn+20P) \geq 2.40 \quad (4)$$

where each symbol of an element in Formula (1) to Formula (4) is to be substituted by a content of a corresponding element (mass %).

[Formula (1)]

To increase a flaking life of a carbonitrided bearing component under a hydrogen-generating environment, it is effective to produce one or more types selected from the group consisting of V carbides having equivalent circle diameters of 150 nm or less, V carbo-nitrides having equivalent circle diameters of 150 nm or less, complex V carbides having equivalent circle diameters of 150 nm or less, and complex V carbo-nitrides having equivalent circle diameters of 150 nm or less, in a large quantity in the carbonitrided bearing component. Here, the complex V carbides mean carbides containing V and Mo. The complex V carbo-nitrides mean carbo-nitrides containing V and Mo. In the following description, V carbides and V carbo-nitrides will also be referred to as "V carbides and the like", and complex V carbides and complex V carbo-nitrides will also be referred to as "complex V carbides and the like". In addition, V carbides and the like having equivalent circle diameters of 150 nm or less will be referred to as "small V carbides and the like", and complex V carbides and the like having equivalent circle diameters of 150 nm or less will be referred to as "small complex V carbides and the like". Here, the equivalent circle diameter means a diameter of a circle having the same area as V carbides and the like or complex V carbides and the like.

In a case where V carbides and the like and complex V carbides and the like are small V carbides and the like and small complex V carbides and the like, which have equivalent circle diameters of 150 nm or less, the small V carbides and the like and the small complex V carbides and the like trap hydrogen. In addition, as being small, small V carbides and the like and small complex V carbides and the like resist serving as an origin of a crack. Therefore, by dispersing small V carbides and the like and small complex V carbides and the like in a carbonitrided bearing component sufficiently, a change in structure is not liable to occur under a hydrogen-generating environment, and as a result, a flaking life of the carbonitrided bearing component under the hydrogen-generating environment can be increased.

Let F1 be defined as F1=0.4Cr+0.4Mo+4.5V. F1 is an index relating to a production amount of small V carbides and the like and small complex V carbides and the like, which trap hydrogen to increase a flaking life of a carbonitrided bearing component under a hydrogen-generating environment. Production of small V carbides and the like and small complex V carbides and the like is accelerated by containing V as well as Cr and Mo. Cr produces Fe-based carbide such as cementite or Cr carbide in a temperature region lower than a temperature region in which V carbides and the like and complex V carbides and the like are produced. Mo produces Mo carbide ($Mo_2C$) in a temperature region lower than the temperature region in which V carbides and the like and complex V carbides and the like are produced. As temperature rises, the Fe-based carbide, the Cr-based carbide, and the Mo carbide are dissolved to serve as nucleation sites of precipitation for the V carbides and the like and complex V carbides and the like.

If F1 is 1.50 or less, even when contents of elements in a chemical composition fall within the respective ranges according to the present embodiment and satisfy Formula (2) to Formula (4), Cr and Mo are insufficient, and thus nucleation sites of precipitation for V carbides and the like and complex V carbides and the like become insufficient. Otherwise, a content of V necessary to produce V carbides and the like and complex V carbides and the like itself becomes insufficient with respect to a content of Cr and a content of Mo. As a result, V carbides and the like and complex V carbides and the like are not produced sufficiently. On the other hand, if F1 is 2.45 or more, even when contents of elements in a chemical composition fall within the respective ranges according to the present embodiment and satisfy Formula (2) to Formula (4), V carbides and the like having equivalent circle diameters of more than 150 nm and complex V carbides and the like having equivalent circle diameters of more than 150 nm are produced. In the following description, V carbides and the like having equivalent circle diameters of more than 150 mu will be also referred to as "coarse V carbides and the like", and complex V carbides and the like having equivalent circle diameters of more than 150 nm will be also referred to as "coarse complex V carbides and the like". Coarse V carbides and the like and coarse complex V carbides and the like have poor performances in trapping hydrogen and thus are liable to cause a change in structure. Therefore, coarse V carbides and the like and coarse complex V carbides and the like decrease a flaking life of a carbonitrided bearing component under a hydrogen-generating environment.

When F1 is more than 1.50 and less than 2.45, on the precondition that contents of elements in a chemical composition fall within the respective ranges according to the present embodiment and satisfy Formula (2) to Formula (4), small V carbides and the like and small complex V carbides and the like are produced adequately in a resulting carbonitrided bearing component, and V carbides and the like and complex V carbides and the like are dissolved sufficiently in a resulting steel material to be a starting material of a carbonitrided bearing component. Therefore, a change in structure is not liable to occur under a hydrogen-generating environment, and thus, a flaking life of the carbonitrided bearing component under the hydrogen-generating environment is increased. In addition, when F1 is less than 2.45, the production of coarse V carbides and the like and coarse complex V carbides and the like is prevented or reduced in the carbonitrided bearing component, and further, a large number of small V carbides and the like and small complex V carbides and the like are also produced in its outer layer. Therefore, a wear resistance of the carbonitrided bearing component is also improved.

[Formula (2)]

Additionally, to increase a flaking life of a carbonitrided bearing component under a hydrogen-generating environment, it is effective to increase a strength of a core portion of the carbonitrided bearing component. To increase a strength of a core portion of a carbonitrided bearing component, it is effective to increase a hardenability of a steel material to be a starting material of the carbonitrided bearing component. However, if a hardenability of a steel material is increased excessively, a machinability of the steel material is decreased.

Let F2 be defined as F2=2.7C+0.4Si+Mn+0.45Ni+0.8Cr+Mo+V. Elements shown in F2 (C, Si, Mn, Ni, Cr, Mo, and V) are primary elements increasing a hardenability of steel, out of the elements in the above-described chemical composition. F2 is thus an index of a strength of a core portion of a carbonitrided bearing component and a machinability of a steel material.

If F2 is 2.20 or less, even when contents of elements in a chemical composition fall within the respective ranges according to the present embodiment and satisfy Formula (1), Formula (3), and Formula (4), a hardenability of a resulting steel material is insufficient. As a result, a strength of a core portion of a resulting carbonitrided bearing component is insufficient, and a sufficient flaking life of the carbonitrided bearing component under a hydrogen-generating environment is not obtained. On the other hand, if F2 is 2.80 or more, even when contents of elements in a chemical composition fall within the respective ranges according to the present embodiment and satisfy Formula (1), Formula (3), and Formula (4), a hardenability of the steel material becomes excessively high. In this case, a sufficient machinability of the steel material is not obtained.

When F2 is more than 2.20 and less than 2.80, on the precondition that contents of elements in a chemical composition fall within the respective ranges according to the present embodiment and satisfy Formula (1), Formula (3), and Formula (4), a sufficient machinability is obtained for the steel material. In addition, a strength of a core portion of a resulting carbonitrided bearing component is sufficiently increased, and a flaking life of the carbonitrided bearing component under a hydrogen-generating environment is sufficiently increased.

[Formula (3)]

Mo is an element that accelerates precipitation of small V carbides and the like and small complex V carbides and the like. Specifically, as described above, F1 satisfying Formula (1) allows provision of a total content of a content of V, a content of Cr, and a content of Mo necessary to produce small V carbides and the like and small complex V carbides and the like. However, as a result of studies conducted by the present inventors, it was revealed that production of sufficient small V carbides and the like and small complex V carbides and the like further requires adjustment of a ratio of a content of Mo to a content of V (=Mo/V). Specifically, if the ratio of a content of Mo to a content of V is excessively low, Mo carbide to serve as nucleation sites of precipitation do not precipitate sufficiently before production of small V carbides and the like and small complex V carbides and the like. In this case, even when a content of V, a content of Cr, and a content of Mo fall within the respective ranges according to the present embodiment and satisfy Formula (1), small V carbides and the like and small complex V carbides and the like are not produced sufficiently.

Let F3 be defined as F3=Mo/V. If F3 is less than 0.58, even when contents of elements in a chemical composition fall within the respective ranges according to the present embodiment and satisfy Formula (1), Formula (2), and Formula (4), small V carbides and the like and small complex V carbides and the like are not produced sufficiently. As a result, a sufficient flaking life of the carbonitrided bearing component is not obtained under a hydrogen-generating environment. On the precondition that contents of elements in a chemical composition fall within the respective ranges according to the present embodiment and satisfy Formula (1), Formula (2), and Formula (4), when F3 is 0.58 or more, that is, Formula (3) is satisfied, small V carbides and the like and complex V carbides and the like are sufficiently produced. As a result, a flaking life of the carbonitrided bearing component is sufficiently increased under a hydrogen-generating environment.

[Formula (4)]

The above-described small V carbides and the like and complex V carbides and the like not only trap hydrogen but also exert precipitation strengthening to strengthen insides of grains. At the same time, when the small V-based precipitates also strengthen grain boundaries in a carbonitrided bearing component under a hydrogen-generating environment, and in addition, penetration of hydrogen can be prevented or reduced, a flaking life of the carbonitrided bearing component under the hydrogen-generating environment can be further increased by a synergetic effect of three effects: (a) intragranular strengthening, (b) grain-boundary strengthening, and (c) hydrogen penetration prevention. The intragranular strengthening indicated as (a) depends on a total content of a content of Mo, a content of V, and a content of Cr, as described above. Meanwhile, for the grain-boundary strengthening indicated as (b), it is effective to reduce a content of P, which is particularly likely to segregate in grain boundaries in the above-described chemical composition. In addition, for the hydrogen penetration prevention indicated as (c), an investigation conducted by the present inventors revealed that it is extremely effective to reduce a content of Mn in a steel material.

Let F4 be defined as F4=(Mo+V+Cr)/(Mn+20P). The numerator in F4 (=(Mo+V+Cr)) is an index of the intragranular strengthening (equivalent to (a) described above). The denominator in F4 (=(Mn+20P)) is an index of the grain-boundary embrittlement and the hydrogen penetration (equivalent to (b) and (c) described above). A large denominator in F4 means that a strength of grain boundaries is low, or that hydrogen is liable to penetrate a resulting carbonitrided bearing component. Therefore, even when an intragranular strengthening index (the numerator in F4) is large, if the grain boundary embrittlement hydrogen penetration index (the denominator in F4) is large, a synergetic effect of an intragranular strengthening mechanism, a grain-boundary strengthening mechanism, and a hydrogen-penetration-prevention mechanism is not obtained, and thus a flaking life of the carbonitrided bearing component under a hydrogen-generating environment is not improved sufficiently.

On the precondition that contents of elements in a chemical composition fall within the respective ranges according to the present embodiment and satisfy Formula (1) to Formula (3), when F4 is 2.40 or more, the synergetic effect of the intragranular strengthening mechanism, the grain-boundary strengthening mechanism, and the hydrogen-penetration-prevention mechanism is obtained, and a sufficient flaking life of a resulting carbonitrided bearing component under a hydrogen-generating environment is obtained.

In the steel material according to the present embodiment, moreover, a proportion of a content of V (mass %) in electrolytic extraction residue of the steel material to the content of V (mass %) in the chemical composition of the steel material is 10.0% or less.

As described above, to produce small V carbides and the like and small complex V carbides and the like sufficiently in a carbonitrided bearing component, it is preferable that V carbides and the like and complex V carbides and the like be dissolved as much as possible in a steel material to be a starting material of the carbonitrided bearing component. When V carbides and the like and complex V carbides and the like remain in a steel material, the V carbides and the like and complex V carbides and the like remaining in the steel material grow to coarsen in a production process of the carbonitrided bearing component. Coarse V carbides and the like and coarse complex V carbides and the like have a poor performance in trapping hydrogen during use of the carbonitrided bearing component under a hydrogen-generating environment. Therefore, coarse V carbides and the like and coarse complex V carbides and the like are liable to cause a change in structure and further liable to serve as an origin of a crack during use of the carbonitrided bearing component under a hydrogen-generating environment. As a result, a flaking life of the carbonitrided bearing component is decreased.

Hence, in the steel material according to the present embodiment, assuming that $[V]_R$ denotes a content of V in electrolytic extraction residue of the steel material, and $[V]_C$ denotes a content of V in the chemical composition of the steel material, an in-residue V-content proportion $RA_V$, which is defined by Formula (A) shown below, is 10.0% or less.

$$RA_V = [V]_R/[V]_C \times 100 \qquad (A)$$

When an in-residue V-content proportion $RA_V$ is 10.0% or less, V carbides and the like and complex V carbides and the like are sufficiently dissolved in a steel material being a starting material of a carbonitrided bearing component. As a result, a decrease in flaking life of the carbonitrided bearing component under a hydrogen-generating environment attributable to coarse V carbides and the like and coarse complex V carbides and the like is prevented or reduced.

The steel material according to the present embodiment having the above configuration exhibits an extremely excellent flaking life of a carbonitrided bearing component subjected to carbonitriding treatment, under a hydrogen-generating environment. FIG. 1 is a graph illustrating flaking lives under a hydrogen-generating environment of a bearing component (Comparative Example) made by performing quenching and tempering on a steel material equivalent to SUJ2 specified in JIS G 4805 (2008) and bearing components (carbonitrided bearing components: Inventive Examples of the present invention) each produced by performing carbonitriding treatment on the steel material according to the present embodiment, which has the chemical composition described above and satisfies Formula (1) to Formula (4) and in which an in-residue V-content proportion $RA_V$ is 10.0% or less. A flaking life test under a hydrogen-generating environment was conducted by a method to be described below in EXAMPLE. The ordinate axis of FIG. 1 indicates a ratio of a flaking life of each Inventive Example of the present invention to a flaking life of Comparative Example (hereinafter, referred to as flaking life ratio), with the flaking life of Comparative Example being defined as 1.0 (reference).

Referring to FIG. 1, the flaking lives under a hydrogen-generating environment of Inventive Examples of the present invention are more than at least 2.0 times the flaking life under a hydrogen-generating environment of the bearing component having a conventional chemical composition (Comparative Example). That is, a flaking life under a hydrogen-generating environment of a carbonitrided bearing component produced from the steel material according to the present embodiment is extremely, significantly improved as compared with that of the conventional bearing component.

The steel material to be a starting material of a carbonitrided bearing component according to the present embodiment made based on the above findings has the following configuration.

[1]
A steel material including a chemical composition consisting of, in mass %:
C: 0.15 to 0.45%,
Si: 0.50% or less,
Mn: 0.20 to 0.60%,
P: 0.015% or less,
S: 0.005% or less,
Cr: 0.80 to 1.50%,
Mo: 0.17 to 0.30%,
V: 0.24 to 0.40%,
Al: 0.005 to 0.100%,
N: 0.0300% or less,
O: 0.0015% or less,
Cu: 0 to 0.20%,
Ni: 0 to 0.20%,
B: 0 to 0.0050%,
Nb: 0 to 0.100%,
Ti: 0 to 0.100%,
Ca: 0 to 0.0010%, and
the balance being Fe and impurities, and
satisfying Formula (1) to Formula (4),
wherein, in its microstructure, a total area fraction of ferrite and pearlite is 10.0% or more, and the balance is bainite, and
a proportion of a content of V (mass %) in electrolytic extraction residue to the content of V (mass %) in the chemical composition is 10.0% or less:

$$1.50<0.4Cr+0.4Mo+4.5V<2.45 \quad (1)$$

$$2.20<2.7C+0.4Si+Mn+0.45Ni+0.8Cr+Mo+V<2.80 \quad (2)$$

$$Mo/V \geq 0.58 \quad (3)$$

$$(Mo+V+Cr)/(Mn+20P) \geq 2.40 \quad (4)$$

where each symbol of an element in Formula (1) to Formula (4) is to be substituted by a content of a corresponding element (mass %).

[2]
The steel material according to [1], wherein
the chemical composition contains one or more types of element selected from the group consisting of:
Cu: 0.01 to 0.20%,
Ni: 0.01 to 0.20%,
B: 0.0001 to 0.0050%,
Nb: 0.005 to 0.100%, and
Ti: 0.005 to 0.100%.

[3]
The steel material according to [1] or [2], wherein
the chemical composition contains
Ca: 0.0001 to 0.0010%.

The steel material according to the present embodiment will be described below in detail. The sign "%" relating to elements means mass % unless otherwise noted.

[Chemical Composition of Steel Material to be Starting Material of Carbonitrided Bearing Component]

The steel material according to the present embodiment is to be a starting material of a carbonitrided bearing component. A chemical composition of the steel material according to the present embodiment contains the following elements.

C: 0.15 to 0.45%

Carbon (C) increases a hardenability of steel. C therefore increases a strength of a core portion of a carbonitrided bearing component produced from the steel material according to the present embodiment as a starting material and increases a toughness of the core portion. In addition, C increases a wear resistance of the carbonitrided bearing component by forming fine carbides and carbo-nitrides through carbonitriding treatment. Moreover, C forms small V carbides and the like and small complex V carbides and the like mainly in carbonitriding treatment. Small V carbides and the like and small complex V carbides and the like trap hydrogen in the steel material during use of the carbonitrided bearing component under a hydrogen-generating environment. As a result, small V carbides and the like and small complex V carbides and the like increase a flaking life under a hydrogen-generating environment of the carbonitrided bearing component. If a content of C is less than 0.15%, the effects described above are not obtained sufficiently even when contents of the other elements in the chemical composition fall within the respective ranges according to the present embodiment. On the other hand, if the content of C is more than 0.45%, even when contents of the other elements fall within the respective ranges according to the present embodiment, V carbides and the like and complex V carbides and the like are not dissolved completely but partly remain in a production process of the steel material. The remaining V carbides and the like and complex V carbides and the like are not dissolved sufficiently in a production process of the carbonitrided bearing component, either. The V carbides and the like and complex V carbides and the like remaining in the steel material then grow during the production process of the carbonitrided bearing component, remaining in forms of coarse V carbides and the like and coarse complex V carbides and the like in the carbonitrided bearing component. In this case, a change in structure occurs during use of the carbonitrided bearing component under a hydrogen-generating environment because the coarse V carbides and the like and the coarse complex V carbides and the like in the carbonitrided bearing component have a poor performance in trapping hydrogen. The coarse V carbides and the like and the coarse complex V carbides and the like in the carbonitrided bearing component additionally serve as an origin of a crack. As a result, a flaking life of the carbonitrided bearing component under a hydrogen-generating environment is decreased. Therefore, the content of C is to be 0.15 to 0.45%. A lower limit of the content of C is preferably 0.16%, more preferably 0.17%, and still more preferably 0.18%. An upper limit of the content of C is preferably 0.40%, more preferably 0.35%, and still more preferably 0.32%.

Si: 0.50% or less

Silicon (Si) is contained unavoidably. In other words, a content of Si is more than 0%. Si increases a hardenability of the steel material and is additionally dissolved in ferrite in the steel material to strengthen the ferrite. This increases a strength of the core portion of the carbonitrided bearing component. However, if the content of Si is more than 0.50%, a hardness of the steel material becomes excessively high, decreasing a machinability of the steel material even when contents of the other elements fall within the respective ranges according to the present embodiment. Therefore, the content of Si is to be 0.50% or less. A lower limit of the content of Si is preferably 0.01%, more preferably 0.02%, and still more preferably 0.05%. An upper limit of the content of Si is preferably 0.40%, more preferably 0.35%, still more preferably 0.32%, and even still more preferably 0.30%.

Mn: 0.20 to 0.60%

Manganese (Mn) increases a hardenability of the steel material. This increases a strength of the core portion of the carbonitrided bearing component, increasing a flaking life of the carbonitrided bearing component under a hydrogen-generating environment. If a content of Mn is less than 0.20%, the effects described above are not obtained sufficiently even when contents of the other elements fall within the respective ranges according to the present embodiment. On the other hand, if the content of Mn is more than 0.60%, a hardness of the steel material becomes excessively high, decreasing a machinability of the steel material even when contents of the other elements fall within the respective ranges according to the present embodiment. A content of Mn being more than 0.60% additionally makes hydrogen liable to penetrate the carbonitrided bearing component during use of the carbonitrided bearing component under a hydrogen-generating environment, decreasing a flaking life of the carbonitrided bearing component. Therefore, the content of Mn is to be 0.20 to 0.60%. A lower limit of the content of Mn is preferably 0.22%, more preferably 0.24%, and still more preferably 0.26%. An upper limit of the content of Mn is preferably 0.55%, more preferably 0.50%, and still more preferably 0.45%.

P: 0.015% or less

Phosphorus (P) is an impurity that is contained unavoidably. In other words, a content of P is more than 0%. P segregates in grain boundaries, decreasing grain boundary strength. If the content of P is more than 0.015%, P segregates in an excess amount in grain boundaries, decreasing grain boundary strength even when contents of the other elements fall within the respective ranges according to the present embodiment. As a result, a flaking life of the carbonitrided bearing component under a hydrogen-generating environment is decreased. Therefore, the content of P is to be 0.015% or less. An upper limit of the content of P is preferably 0.013%, and more preferably 0.010%. The content of P is preferably as low as possible. However, an excessive reduction of the content of P raises a production cost. Therefore, with consideration given to normal industrial production, a lower limit of the content of P is preferably 0.001%, and more preferably 0.002%.

S: 0.005% or less

Sulfur (S) is an impurity that is contained unavoidably. In other words, a content of S is more than 0%. S produces sulfide-based inclusions. Coarse sulfide-based inclusions are liable to serve as an origin of a crack during use of the carbonitrided bearing component under a hydrogen-generating environment. If the content of S is more than 0.005%, the sulfide-based inclusions coarsen, decreasing a flaking life of the carbonitrided bearing component under a hydrogen-generating environment even when contents of the other elements fall within the respective ranges according to the present embodiment. Therefore, the content of S is to be 0.005% or less. An upper limit of the content of S is preferably 0.004%, and more preferably 0.003%. The content of S is preferably as low as possible. However, an excessive reduction of the content of S raises a production cost. Therefore, with consideration given to normal industrial production, a lower limit of the content of S is preferably 0.001%, and more preferably 0.002%.

Cr: 0.80 to 1.50%

Chromium (Cr) increases a hardenability of the steel material. This increases a strength of the core portion of the carbonitrided bearing component. When contained in combination with V and Mo. Cr additionally accelerates production of small V carbides and the like and small complex V carbides and the like during carbonitriding treatment. This increases not only a wear resistance of the carbonitrided bearing component but also a flaking life of the carbonitrided component under a hydrogen-generating environment. If a content of Cr is less than 0.80%, the effects described above are not obtained sufficiently. On the other hand, if the content of Cr is more than 1.50%, carburizing properties of carbonitriding treatment are decreased even when contents of the other elements fall within the respective ranges according to the present embodiment. In this case, a sufficient wear resistance of the carbonitrided bearing component is not obtained. Therefore, the content of Cr is to be 0.80 to 1.50%. A lower limit of the content of Cr is preferably 0.85%, more preferably 0.88%, and still more preferably 0.90%. An upper limit of the content of Cr is preferably 1.45%, more preferably 1.40%, and still more preferably 1.35%.

Mo: 0.17 to 0.30%

As with Cr, molybdenum (Mo) increases a hardenability of the steel material. This increases a strength of the core portion of the carbonitrided bearing component. When contained in combination with V and Cr, Mo additionally accelerates production of small V carbides and the like and small complex V carbides and the like during carbonitriding treatment. This increases not only a wear resistance of the carbonitrided bearing component but also a flaking life of the carbonitrided bearing component under a hydrogen-generating environment. If a content of Mo is less than 0.17%, the effects described above are not obtained sufficiently. On the other hand, if the content of Mo is more than 0.30%, a strength of the steel material becomes excessively high. In this case, a machinability of the steel material is decreased. Therefore, the content of Mo is to be 0.17 to 0.30%. A lower limit of the content of Mo is preferably 0.18%, more preferably 0.19%, and still more preferably 0.20%. An upper limit of the content of Mo is preferably 0.29%, more preferably 0.28%, and still more preferably 0.27%.

V: 0.24 to 0.40%

Vanadium (V) forms small V carbides and the like and small complex V carbides and the like in a production process of the carbonitrided bearing component using the steel material. Small V carbides and the like and small complex V carbides and the like trap hydrogen penetrating into the carbonitrided bearing component during use of the carbonitrided bearing component under a hydrogen-generating environment. Equivalent circle diameters of small V carbides and the like and small complex V carbides and the like in the carbonitrided bearing component are as small as 150 nm or less. Thus, even after small V carbides and the like and small complex V carbides and the like trap hydrogen, the small V carbides and the like and small complex V carbides and the like resist serving as an origin of a change in structure. As a result, a flaking life of the carbonitrided bearing component under a hydrogen-generating environment is increased. In addition, V increases a wear resistance of the carbonitrided bearing component by forming small V carbides and the like and small complex V carbides and the like in a production process of the carbonitrided bearing component. If a content of V is less than 0.24%, the effects described above are not obtained sufficiently. On the other hand, if the content of V is more than 0.40%, even when contents of the other elements fall within the respective ranges according to the present embodiment, V carbides and complex V carbides and the like are not dissolved completely but partly remain in a production process of the steel material. The remaining V carbides and the like and complex V carbides and the like are not dissolved sufficiently in a production process of the carbonitrided bearing component, either, and may grow to become coarse V carbides and the like and coarse complex V carbides and the like in the production process of the carbonitrided bearing component. Coarse V carbides and the like and coarse complex V carbides and the like decrease a toughness of a core portion of a carbonitrided bearing component. Moreover, coarse V carbides and the like and coarse complex V carbides and the like in a carbonitrided bearing component have poor performances in trapping hydrogen. Therefore, coarse V carbides and the like and coarse complex V carbides and the like are liable to cause a change in structure during use of the carbonitrided bearing component under a hydrogen-generating environment. Coarse V carbides and the like and coarse complex V carbides and the like additionally serve as an origin of a crack. Therefore, coarse V carbides and the like and coarse complex V carbides and the like decrease a flaking life of a carbonitrided bearing component under a hydrogen-generating environment. Therefore, the content of V is to be 0.24 to 0.40%. A lower limit of the content of V is preferably 0.25%, more preferably 0.26%, and still more preferably 0.27%. An upper limit of the content of V is preferably 0.39%, more preferably 0.38%, and still more preferably 0.36%.

Al: 0.005 to 0.100%

Aluminum (Al) deoxidizes steel. If a content of Al is less than 0.005%, this effect is not obtained sufficiently even when contents of the other elements fall within the respective ranges according to the present embodiment. On the other hand, if the content of Al is more than 0.100%, coarse oxide-based inclusions are produced even when contents of the other elements fall within the respective ranges according to the present embodiment. Coarse oxide-based inclusions serve as an origin of a fatigue fracture of the carbonitrided bearing component under a hydrogen-generating environment. As a result, a flaking life of the carbonitrided bearing component under a hydrogen-generating environment is decreased. Therefore, the content of Al is to be 0.005 to 0.100%. A lower limit of the content of Al is preferably 0.008%, and more preferably 0.010%. An upper limit of the content of Al is preferably 0.080%, more preferably 0.070%, and still more preferably 0.060%. The content of Al as used herein means a content of Al in total (Total Al).

N: 0.0300% or less

Nitrogen (N) is an impurity that is contained unavoidably. In other words, a content of N is more than 0%. N is dissolved in the steel material, decreasing a hot workability of the steel material. If the content of N is more than 0.0300%, a hot workability of the steel material is significantly decreased. Therefore, the content of N is to be 0.0300% or less. An upper limit of the content of N is preferably 0.0250%, more preferably 0.0200%, still more preferably 0.0150%, and even still more preferably 0.0130%. The content of N is preferably as low as possible. However, an excessive reduction of the content of N raises a production cost. Therefore, with consideration given to normal industrial production, a lower limit of the content of N is preferably 0.0001%, and more preferably 0.0002%.

O (oxygen): 0.0015% or less

Oxygen (O) is an impurity that is contained unavoidably. In other words, a content of O is more than 0%. O combines with other elements in steel to produce coarse oxide-based inclusions. Coarse oxide-based inclusions serve as an origin of a fatigue fracture of the carbonitrided bearing component under a hydrogen-generating environment. As a result, a flaking life of the carbonitrided bearing component under a hydrogen-generating environment is decreased. If the content of O is more than 0.0015%, a flaking life of the carbonitrided bearing component under a hydrogen-generating environment is significantly decreased even when contents of the other elements fall within the respective ranges according to the present embodiment. Therefore, the content of O is to be 0.0015% or less. An upper limit of the content of O is preferably 0.0013%, and more preferably 0.0012%. The content of O is preferably as low as possible. However, an excessive reduction of the content of O raises a production cost. Therefore, with consideration given to normal industrial production, a lower limit of the content of O is preferably 0.0001%, and more preferably 0.0002%.

The balance of the chemical composition of the steel material according to the present embodiment is Fe and impurities. The impurities herein mean those that are mixed in from ores and scraps as raw materials or from a production environment when the steel material is produced industrially, and that are allowed to be in the steel material within ranges in which the impurities have no adverse effect on the steel material according to the present embodiment.

[Optional Elements]

The chemical composition of the steel material according to the present embodiment may further contain, in lieu of a part of Fe, one or more types of element selected from the group consisting of Cu, Ni, B, Nb, and Ti. These elements are optional elements and all increase a strength of the carbonitrided bearing component.

Cu: 0 to 0.20%

Copper (Cu) is an optional element and need not be contained. In other words, a content of Cu may be 0%. When contained, Cu increases a hardenability of the steel material. This increases a strength of the steel material and a strength of the core portion of the carbonitrided bearing component. A trace amount of Cu contained provides the effects described above to some extent. However, if the content of Cu is more than 0.20%, a strength of the steel material is increased excessively, and a machinability of the steel material is decreased even when contents of the other elements fall within the respective ranges according to the present embodiment. Therefore, the content of Cu is to be 0 to 0.20%. A lower limit of the content of Cu is preferably more than 0%, more preferably 0.01%, still more preferably 0.02%, still more preferably 0.03%, and even still more preferably 0.05%. An upper limit of the content of Cu is preferably 0.18%, more preferably 0.16%, and still more preferably 0.15%.

Ni: 0 to 0.20%

Nickel (Ni) is an optional element and need not be contained. In other words, a content of Ni may be 0%. When contained, Ni increases a hardenability of the steel material. This increases a strength of the steel material and a strength of the core portion of the carbonitrided bearing component. A trace amount of Ni contained provides the effects described above to some extent. However, if the content of Ni is more than 0.20%, a strength of the steel material is increased excessively, and a machinability of the steel material is decreased even when contents of the other elements fall within the respective ranges according to the present embodiment. Therefore, the content of Ni is to be 0 to 0.20%. A lower limit of the content of Ni is preferably more than 0%, more preferably 0.01%, still more preferably 0.02%, still more preferably 0.03%, and even still more preferably 0.05%. An upper limit of the content of Ni is preferably 0.18%, more preferably 0.16%, and still more preferably 0.15%.

B: 0 to 0.0050%

Boron (B) is an optional element and need not be contained. In other words, a content of B may be 0%. When contained, B increases a hardenability of the steel material. This increases a strength of the steel material and a strength of the core portion of the carbonitrided bearing component. In addition, B prevents P from segregating in grain boundaries. A trace amount of B contained provides the effects described above to some extent. However, if the content of B is more than 0.0050%, B nitride (BN) is formed, decreasing a toughness of the core portion of the carbonitrided bearing component. Therefore, the content of B is to be 0 to 0.0050%. A lower limit of the content of B is preferably more than 0%, more preferably 0.0001%, still more preferably 0.0003%, even still more preferably 0.0005%, and even still more preferably 0.0010%. An upper limit of the content of B is preferably 0.0030%, more preferably 0.0025%, and still more preferably 0.0020%.

Nb: 0 to 0.100%

Niobium (Nb) is an optional element and need not be contained. In other words, a content of Nb may be 0%. When contained, Nb combines with C and N in steel to form its carbide, nitride, and carbo-nitride. These precipitates exert precipitation strengthening to increase a strength of the carbonitrided bearing component. A trace amount of Nb contained provides the effects described above to some extent. However, if the content of Nb is more than 0.100%, a toughness of the core portion of the carbonitrided bearing component is decreased. Therefore, the content of Nb is to be 0 to 0.100%. A lower limit of the content of Nb is preferably more than 0%, more preferably 0.005%, and still more preferably 0.010%. An upper limit of the content of Nb is preferably 0.080%, more preferably 0.070%, still more preferably 0.050%, and even still more preferably 0.040%.

Ti: 0 to 0.100%

Titanium (Ti) is an optional element and need not be contained. In other words, a content of Ti may be 0%. When contained, as with Nb, Ti forms its carbide, nitride, and carbo-nitride, increasing a strength of the carbonitrided bearing component. A trace amount of Ti contained provides the effects described above to some extent. However, if the content of Ti is more than 0.100%, a toughness of the core portion of the carbonitrided bearing component is decreased. Therefore, the content of Ti is to be 0 to 0.100%. A lower limit of the content of Ti is preferably more than 0%, more preferably 0.005%, and still more preferably 0.010%. An upper limit of the content of Ti is preferably 0.080%, more preferably 0.070%, still more preferably 0.050%, and even still more preferably 0.040%.

The chemical composition of the steel material according to the present embodiment may further contain Ca in lieu of a part of Fe.

Ca: 0 to 0.0010%

Calcium (Ca) is an optional element and need not be contained. In other words, a content of Ca may be 0%. When contained, Ca is dissolved in inclusions in the steel material, refining and spheroidizing sulfides. In this case, a hot workability of the steel material is increased. A trace amount of Ca contained provides the effects described above to some extent. However, if the content of Ca is more than 0.0010%, coarse oxide-based inclusions are produced in the steel material. When coarse oxide-based inclusions trap hydrogen during use of the carbonitrided bearing component under a hydrogen-generating environment, a change in structure is liable to occur. Occurrence of a change in structure decreases a flaking life of the carbonitrided bearing component. Therefore, the content of Ca is to be 0 to 0.0010%. A lower limit of the content of Ca is preferably more than 0%, more preferably 0.0001%, and still more preferably 0.0003%. An upper limit of the content of Ca is preferably 0.0009%, and more preferably 0.0008%.

[Formula (1) to Formula (4)]

The chemical composition of the steel material according to the present embodiment additionally satisfies the following Formula (1) to Formula (4):

$$1.50 < 0.4Cr + 0.4Mo + 4.5V < 2.45 \tag{1}$$

$$2.20 < 2.7C + 0.4Si + Mn + 0.45Ni + 0.8Cr + Mo + V < 2.80 \tag{2}$$

$$Mo/V \geq 0.58 \tag{3}$$

$$(Mo+V+Cr)/(Mn+20P) \geq 2.40 \tag{4}$$

where each symbol of an element in Formula (1) to Formula (4) is to be substituted by a content of a corresponding element (mass %).

[Formula (1)]

The chemical composition of the steel material according to the present embodiment satisfies Formula (1):

$$1.50 < 0.4Cr + 0.4Mo + 4.5V < 2.45 \tag{1}$$

where symbols of elements in Formula (1) are to be substituted by contents of corresponding elements (mass %).

Let F1 be defined as F1=0.4Cr+0.4Mo+4.5V. F1 is an index relating to production of small V carbides and the like (small V carbides and small V carbo-nitrides) and small complex V carbides and the like (small complex V carbides and small complex V carbo-nitrides), which trap hydrogen to increase a flaking life of the carbonitrided bearing component under a hydrogen-generating environment. As described above, the production of small V carbides and the like and small complex V carbides and the like is accelerated by containing V as well as Cr and Mo. Cr produces Fe-based carbide such as cementite or Cr carbide in a temperature region lower than a temperature region in which V carbides and the like and complex V carbides and the like are produced. Mo produces Mo carbide ($Mo_2C$) in a temperature region lower than a temperature region in which V carbides and the like and complex V carbides and the like are produced. As temperature rises, the Fe-based carbide, the Cr-based carbide, and the Mo carbide are dissolved to serve as nucleation sites of precipitation for V carbides and the like and complex V carbides and the like.

If F1 is 1.50 or less, even when contents of elements in a chemical composition fall within the respective ranges according to the present embodiment and satisfy Formula (2) to Formula (4), Cr and Mo are insufficient, and thus nucleation sites of precipitation for V carbides and the like and complex V carbides and the like become insufficient. Otherwise, a content of V to produce V carbides and the like and complex V carbides and the like itself becomes insufficient with respect to a content of Cr and a content of Mo. As a result, small V carbides and the like and small complex V carbides and the like are not produced sufficiently. On the other hand, if F1 is 2.45 or more, even when contents of elements in a chemical composition fall within the respective ranges according to the present embodiment and satisfy Formula (2) to Formula (4), coarse V carbides and the like and coarse complex V carbides and the like are produced. In this case, in a production process of the steel material, V carbides and the like and complex V carbides and the like are not dissolved sufficiently but partly remain in the steel material. Therefore, the V carbides and the like and complex V carbides and the like remaining in the steel material grow into coarse V carbides and the like and coarse complex V carbides and the like in a production process of the carbonitrided bearing component. Coarse V carbides and the like and coarse complex V carbides and the like have poor performances in trapping hydrogen. Therefore, coarse V carbides and the like and coarse complex V carbides and the like are liable to cause a change in structure during use of the carbonitrided bearing component under a hydrogen-generating environment. Coarse V carbides and the like and coarse complex V carbides and the like additionally serve as an origin of a crack. As a result, a flaking life of the carbonitrided bearing component under a hydrogen-generating environment is decreased.

When F1 is more than 1.50 and less than 2.45, on the precondition that contents of elements in a chemical composition fall within the respective ranges according to the present embodiment and satisfy Formula (2) to Formula (4), small V carbides and small complex V carbides are produced adequately in a resulting carbonitrided bearing component, and V carbides and the like and complex V carbides and the like are dissolved sufficiently in a resulting steel material. Thus, a change in structure attributable to hydrogen cracking is not liable to occur during use of the carbonitrided bearing component under a hydrogen-generating environment. As a result, a flaking life of the carbonitrided bearing component under a hydrogen-generating environment is increased.

A lower limit of F1 is preferably 1.51, more preferably 1.52, still more preferably 1.54, even still more preferably 1.55, and even still more preferably 1.56. An upper limit of F1 is preferably 2.44, more preferably 2.43, and still more preferably 2.42. A numerical value of F1 is to be a value obtained by rounding off F1 to the third decimal place.

[Formula (2)]

The chemical composition of the steel material according to the present embodiment further satisfies Formula (2):

$$2.20 < 2.7C + 0.4Si + Mn + 0.45Ni + 0.8Cr + Mo + V < 2.80 \quad (2)$$

where symbols of elements in Formula (2) are to be substituted by contents of corresponding elements (mass %).

Let F2 be defined as F2=2.7C+0.4Si+Mn+0.45Ni+0.8Cr+Mo+V. Elements shown in F2 each increase a hardenability of the steel material. F2 is thus an index of a strength of the core portion of the carbonitrided bearing component.

If F2 is 2.20 or less, even when contents of elements in a chemical composition fall within the respective ranges according to the present embodiment and satisfy Formula (1), Formula (3), and Formula (4), a hardenability of a resulting steel material is insufficient. Therefore, a strength of the core portion of the carbonitrided bearing component is not sufficient. In this case, a sufficient flaking life of the carbonitrided bearing component under a hydrogen-generating environment is not obtained. On the other hand, if F2 is 2.80 or more, even when contents of elements in a chemical composition fall within the respective ranges according to the present embodiment and satisfy Formula (1), Formula (3), and Formula (4), a hardenability of the steel material becomes excessively high. In this case, in a microstructure of the steel material, a total area fraction of ferrite and pearlite is less than 10.0%. Thus, a sufficient machinability of the steel material is not obtained.

When F2 is more than 2.20 and less than 2.80, on the precondition that contents of elements in a chemical composition fall within the respective ranges according to the present embodiment and satisfy Formula (1), Formula (3), and Formula (4), a sufficient machinability is obtained for the steel material. Furthermore, a strength of a core portion of a resulting carbonitrided bearing component is sufficiently increased, and a flaking life of the carbonitrided bearing component under a hydrogen-generating environment is sufficiently increased. A lower limit of F2 is preferably 2.23, more preferably 2.25, still more preferably 2.30, even still more preferably 2.35, and even still more preferably 2.45. An upper limit of F2 is preferably 2.78, more preferably 2.75, still more preferably 2.73, and even still more preferably 2.70. A numerical value of F2 is to be a value obtained by rounding off F2 to the third decimal place.

[Formula (3)]

The chemical composition of the steel material according to the present embodiment further satisfies Formula (3).

$$Mo/V \geq 0.58 \quad (3)$$

where symbols of elements in Formula (3) are to be substituted by contents of corresponding elements (mass %).

Let F3 be defined as F3=Mo/V. In the steel material according to the present embodiment, as described above, F1 satisfying Formula (1) allows provision of a total content of a content of V, a content of Cr, and a content of Mo necessary to produce small V carbides and the like and small complex V carbides and the like. However, production of sufficient small V carbides and the like and small complex V carbides and the like further requires adjustment of a ratio of a content of Mo to a content of V. Specifically, if the ratio of a content of Mo to a content of V (=Mo/V) is excessively low, Mo carbide to serve as nucleation sites of precipitation do not precipitate sufficiently before production of V carbides and the like and complex V carbides and the like. In this case, even when a content of V, a content of Cr, and a content of Mo fall within the respective ranges according to the present embodiment and satisfy Formula (1), small V carbides and the like and small complex V carbides and the like are not produced sufficiently. Specifically, if F3 is less than 0.58, even when contents of elements in a chemical composition fall within the respective ranges according to the present embodiment and satisfy Formula (1), Formula (2), and Formula (4), small V carbides and the like and small complex V carbides and the like are not produced sufficiently in a resulting carbonitrided bearing component. As a result, a sufficient flaking life of the carbonitrided bearing component under a hydrogen-generating environment is not obtained.

On the precondition that contents of elements in a chemical composition fall within the respective ranges according to the present embodiment and satisfy Formula (1), Formula (2), and Formula (4), when F3 is 0.58 or more, that is, Formula (3) is satisfied, small V carbides and the like and small complex V carbides and the like are sufficiently produced in a resulting carbonitrided bearing component. As a result, a flaking life of the carbonitrided bearing component under a hydrogen-generating environment is sufficiently increased. A lower limit of F3 is preferably 0.60, more preferably 0.65, still more preferably 0.68, even still more preferably 0.70, even still more preferably 0.73, and even still more preferably 0.76. A numerical value of F3 is to be a value obtained by rounding off F3 to the third decimal place.

[Formula (4)]

The chemical composition of the steel material according to the present embodiment further satisfies Formula (4):

$$(Mo+V+Cr)/(Mn+20P) \geq 2.40 \qquad (4)$$

where symbols of elements in Formula (4) are to be substituted by contents of corresponding elements (mass %).

Let F4 be defined as $F4=(Mo+V+Cr)/(Mn+20P)$. Small V carbides and the like and small complex V carbides and the like not only trap hydrogen but also exert precipitation strengthening to strengthen insides of grains. At the same time, when the small V-based precipitates also strengthen grain boundaries in a carbonitrided bearing component under a hydrogen-generating environment, and in addition, penetration of hydrogen can be prevented or reduced, a flaking life of the carbonitrided bearing component under the hydrogen-generating environment can be further increased by a synergetic effect of three effects: (a) intra-granular strengthening, (b) grain-boundary strengthening, and (c) hydrogen penetration prevention. The intragranular strengthening indicated as (a) depends on a total content of a content of Mo, a content of V, and a content of Cr, as described above. Meanwhile, for the grain-boundary strengthening indicated as (b), it is effective to reduce a content of P, which is particularly likely to segregate in grain boundaries in the above-described chemical composition. In addition, for the hydrogen penetration prevention indicated as (c), it is extremely effective to reduce a content of Mn in the steel material.

The numerator in F4 (=(Mo+V+Cr)) is an index of the intragranular strengthening (equivalent to (a) described above). The denominator in F4 (=(Mn+20P)) is an index of the grain-boundary embrittlement and the hydrogen penetration (equivalent to (b) and (c) described above). A large denominator in F4 means that a strength of grain boundaries is low, or that hydrogen is liable to penetrate a resulting carbonitrided bearing component. Therefore, even when an intragranular strengthening index (the numerator in F4) is large, if the grain boundary embrittlement and hydrogen penetration index (the denominator in F4) is large, a synergetic effect of an intragranular strengthening mechanism, a grain-boundary strengthening mechanism, and a hydrogen-penetration-prevention mechanism is not obtained, and thus a flaking life of the carbonitrided bearing component under a hydrogen-generating environment is not improved sufficiently.

On the precondition that contents of elements in a chemical composition fall within the respective ranges according to the present embodiment and satisfy Formula (1) to Formula (3), when F4 is 2.40 or more, the synergetic effect of the intragranular strengthening mechanism, the grain-boundary strengthening mechanism, and the hydrogen-penetration-prevention mechanism is obtained, and a sufficient flaking life of a resulting carbonitrided bearing component under a hydrogen-generating environment is obtained. A lower limit of F4 is preferably 2.42, more preferably 2.45, still more preferably 2.47, even still more preferably 2.50, and even still more preferably 2.52. A numerical value of F4 is to be a value obtained by rounding off F4 to the third decimal place.

[Microstructure of Steel Material]

A microstructure of the steel material according to the present embodiment means a structure in which a total area fraction of ferrite and pearlite is 10.0% or more, and the balance is bainite. In a case where a content of C in a chemical composition is low, in the microstructure of the steel material according to the present embodiment, a total area fraction of ferrite and pearlite is 50.0% or more, and the balance is bainite. In contrast, in a case where a content of C in a chemical composition is high, in the microstructure of the steel material according to the present embodiment, an area fraction of bainite is 50.0% or more, and the balance is ferrite and pearlite. In the microstructure of the steel material according to the present embodiment, the total area fraction of ferrite and pearlite is at least 10.0% or more, and the balance is bainite, irrespective of variations in content of C. It is preferable that, in the microstructure of the steel material according to the present embodiment, a total area fraction of ferrite and pearlite be 10.0 to 90.0%, and the balance be bainite. An upper limit of the total area fraction of ferrite and pearlite is preferably 80.0%, and more preferably 78.0%. A lower limit of the total area fraction of ferrite and pearlite is preferably 20.0%, and more preferably 25.0%. Note that, in the microstructure of the steel material, regions other than bainite, ferrite, and pearlite are, for example, retained austenite, precipitates (including cementite), and inclusions; however, a total area fraction of the retained austenite, precipitates, and inclusions in the microstructure is negligibly small.

[Method for Measuring Area Fractions of Ferrite and Pearlite]

The total area fraction (%) of ferrite and pearlite in the microstructure of the steel material according to the present embodiment, and the area fraction (%) of bainite in the microstructure are measured by the following method. A sample is taken from a center position of a radius R connecting a surface and a central axis (R/2 position) of a cross section of a steel material being a steel bar or a wire rod that is perpendicular to a longitudinal direction (axial direction) of the steel material (hereinafter, referred to as transverse section). Of surfaces of the sample taken, a surface equivalent to the transverse section is determined as an observation surface. The observation surface is subjected to mirror polish and then etched with 2% nitric acid-alcohol (Nital etchant). The etched observation surface is observed under an optical microscope with 500× magnification, and photographic images of freely-selected 20 visual fields on the etched observation surface are created. A size of each of the visual fields is set at 100 μm×100 μm.

In each visual field, phases such as bainite, ferrite, and pearlite have their own different contrasts. Therefore, the phases are identified based on their respective contrasts. Of the identified phases, a total area of ferrite (μm²) and a total area of pearlite (μm²) are determined in each visual field. A proportion of a summed area of total areas of ferrite and total areas of pearlite in all the visual fields to a total area of all the visual fields is defined as a total area fraction (%) of ferrite and pearlite. Using the total area fraction of ferrite and pearlite, a bainite area fraction (%) is determined by the following method.

Bainite area fraction=100.0−Total area fraction of ferrite and pearlite

The total area fraction (%) of ferrite and pearlite is a value obtained by rounding off the total area fraction (%) of ferrite and pearlite to the second decimal place.

[Content of V in Electrolytic Extraction Residue of Steel Material]

Furthermore, in the steel material according to the present embodiment, assuming that $[V]_R$ denotes a content of V in electrolytic extraction residue of the steel material, and $[V]_C$ denotes a content of V in the chemical composition of the steel material, an in-residue V-content proportion $RA_V$, which is defined by Formula (A) shown below, is 10.0% or less.

$$RA_V=[V]_R/[V]_C\times100 \qquad (A)$$

In the steel material according to the present embodiment, V carbides and the like and complex V carbides and the like are sufficiently dissolved, and an amount of remaining V carbides and the like and complex V carbides and the like is sufficiently small. Specifically, the in-residue V-content proportion $RA_V$, which is defined by Formula (A), is 10.0% or less.

If the in-residue V-content proportion $RA_V$ is more than 10.0%, V carbides and the like and complex V carbides and the like are not dissolved sufficiently in the steel material. In this case, the V carbides and the like and complex V carbides and the like remaining in the steel material grow into coarse V carbides and the like and coarse complex V carbides and the like in a production process of a carbonitrided bearing component using the steel material as a starting material. Coarse V carbides and the like and coarse complex V carbides and the like have poor performances in trapping hydrogen. Therefore, coarse V carbides and the like and coarse complex V carbides and the like are liable to cause a change in structure during use of the carbonitrided bearing component under a hydrogen-generating environment. If a change in structure occurs, a flaking life of the carbonitrided bearing component under a hydrogen-generating environment is decreased.

When the in-residue V-content proportion $RA_V$ is 10.0% or less, V carbides and the like and complex V carbides and the like are dissolved sufficiently in the steel material. As a result, a decrease in flaking life of the carbonitrided bearing component under a hydrogen-generating environment attributable to coarse V carbides and the like and coarse complex V carbides and the like is prevented or reduced. An upper limit of the in-residue V-content proportion $RA_V$ is prefer-ably 9.5%, more preferably 9.2%, still more preferably 9.0%, even still more preferably 8.5%, even still more preferably 8.3%, even still more preferably 8.0%, even still more preferably 7.5%, even still more preferably 7.0%, even still more preferably 6.5%, and even still more preferably 6.0%.

[Method for Determining In-Residue V-Content Proportion $RA_V$]

A content of V in electrolytic extraction residue of the steel material according to the present embodiment can be measured by the following method. First, precipitates and inclusions in the steel material are captured as residues. From the steel material, cylindrical specimens each having a diameter of 6 mm and a length of 50 mm are taken. Specifically, three cylindrical specimens described above are taken from an R/2 position of a cross section of the steel material perpendicular to a longitudinal direction (axial direction) of the steel material (hereinafter, referred to as transverse section). A surface of each of the cylindrical specimens taken is subjected to preparatory electropolishing to be polished by about 50 μm, by which a new surface is obtained. The cylindrical specimens subjected to the electropolishing are electrolyzed with an electrolyte (10% acetylacetone+1% tetraammonium+methanol). After the electrolysis, residues are captured by passing the electrolyte through a 0.2-μm filter. The obtained electrolytic extraction residue are subjected to acid decomposition, and inductively coupled plasma (ICP) optical emission spectrometry is performed to determine the content of V in the electrolytic extraction residue, by mass %, with respect to the steel material (base metal) assumed to be 100 mass %. An arithmetic mean value of contents of V in electrolytic extraction residue of the cylindrical specimens (i.e., an arithmetic mean value of three contents of V) is defined as a content of V in the electrolytic extraction residue of the steel material, $[V]_R$. The content of V in the electrolytic extraction residue, $[V]_R$, is a value obtained by rounding off the above-described arithmetic mean value to the second decimal place. Using the content of V in the chemical composition of the steel material, $[V]_C$, and the content of V in the electrolytic extraction residue, $[V]_R$, obtained by the above-described measurement, the in-residue V-content proportion $RA_V$ is determined by Formula (A). The in-residue V-content proportion $RA_V$ is a value obtained by rounding off the in-residue V-content proportion $RA_V$ to the second decimal place.

$$RA_V=[V]_R/[V]_C\times100 \qquad (A)$$

In the steel material according to the present embodiment having the above-described configuration, contents of elements fall within the above-described respective ranges according to the present embodiment, and F1 to F4 satisfy Formula (1) to Formula (4). In addition, in a microstructure of the steel material, a total area fraction of ferrite and pearlite is 10.0% or more, the balance is bainite, and moreover, an in-residue V-content proportion $RA_V$ is 10.0% or less. For these reasons, the steel material according to the present embodiment is excellent in machinability. In addition, a carbonitrided bearing component obtained by performing hot forging processing and then carbonitriding treatment on the steel material according to the present embodiment provides an excellent wear resistance and an excellent toughness of its core portion, and moreover, the carbonitrided bearing component provides an excellent flaking life under a hydrogen-generating environment.

[Method for Producing Steel Material According to the Present Embodiment]

An example of a method for producing the steel material according to the present embodiment will be described. The method for producing the steel material described below is an example of producing the steel material to be a starting material of a carbonitrided bearing component according to the present embodiment. Therefore, the steel material having the above-described configuration may be produced by a production method other than the production method described below. However, the production method described below is a preferable example of the method for producing the steel material according to the present embodiment.

The example of the method for producing the steel material according to the present embodiment includes a steelmaking process of refining molten steel and casting the molten steel to produce a starting material (cast piece), and a hot-working process of performing hot working on the starting material to produce the steel material. The processes will be each described below.

[Steelmaking Process]

In the steelmaking process, first, a molten steel including the above-described chemical composition, in which contents of elements fall within the respective ranges according to the present embodiment, and F1 to F4 satisfy Formula (1) to Formula (4) is produced. A method for the refining is not limited to a specific method, and a well-known refining method may be used. For example, molten iron produced by a well-known method is subjected to refining in a converter (first refining). Molten steel tapped from the converter is subjected to a well-known secondary refining. In the secondary refining, alloying elements for component formulation are added to produce a molten steel including a chemical composition in which contents of elements fall within the respective ranges according to the present embodiment, and F1 to F4 satisfy Formula (1) to Formula (4).

Using the molten steel produced by the above-described refining method, a starting material is produced by a well-known casting process. For example, using the molten steel, an ingot is produced by an ingot-making process. Alternatively, using the molten steel, a bloom or a billet may be produced by a continuous casting process. By the above method, the starting material (bloom or ingot) is produced.

[Hot-Working Process]

In the hot-working process, the starting material (bloom or ingot) produced by the steelmaking process is subjected to hot working to be produced into the steel material. The steel material is a steel bar or a wire rod.

The hot-working process includes a rough-rolling process and a finish-rolling process. In the rough-rolling process, the starting material is subjected to hot working to be produced into a billet. In the rough-rolling process, for example, a blooming mill is used. The starting material is subjected to blooming with the blooming mill to be produced into the billet. In a case where a continuous mill is arranged downstream of the blooming mill, the billet produced by the blooming may be further subjected to hot rolling using the continuous mill to be produced into a billet having a smaller size. In the continuous mill, horizontal stands each of which includes a pair of horizontal rolls and vertical stands each of which includes a pair of vertical rolls are arranged alternately in a row. Through the above process, in the rough-rolling process, the starting material is produced into a billet.

In the rough-rolling process, a heating temperature and a retention time in a reheating furnace are to be as follows.

Heating temperature: 1150 to 1300° C.

Retention time at the above heating temperature: 1.5 to 10.0 hours

Here, the heating temperature is a furnace temperature (° C.) of the reheating furnace. The retention time is a retention time (hours) for which the furnace temperature of the reheating furnace is set at 1150 to 1300° C.

If the heating temperature is less than 1150° C., or the retention time for which the heating temperature is set at 1150 to 1300° C. is less than 1.5 hours, V carbides and complex V carbides in the starting material are not dissolved sufficiently. As a result, the in-residue V-content proportion $RA_V$ in the steel material becomes more than 10.0%. On the other hand, if the heating temperature is more than 1300° C., or the retention time for 1150 to 1300° C. is more than 10.0 hours, a unit requirement becomes excessively high, increasing a production cost.

When the heating temperature of the rough-rolling process is 1150 to 1300° C., and the retention time for 1150 to 1300° C. is 1.5 to 10.0 hours, V carbides and the like and complex V carbides and the like in the starting material are sufficiently dissolved.

In the finish-rolling process, first, the billet is heated with a reheating furnace. The heated billet is subjected to hot rolling using a continuous mill to be produced into a steel bar or a wire rod being the steel material. In the finish-rolling process, a heating temperature and a retention time in the reheating furnace are to be as follows.

Heating temperature: 1150 to 1300° C.

Retention time at the above heating temperature: 1.5 to 5.0 hours

Here, the heating temperature is a furnace temperature (° C.) of the reheating furnace. The retention time is a retention time (hours) for which the furnace temperature of the reheating furnace is set at 1150 to 1300° C.

In the finish-rolling process, precipitation of V carbides and the like and complex V carbides and the like is prevented or reduced as much as possible in the finish-rolling process. If the heating temperature in the reheating furnace in the finish-rolling process is less than 1150° C., or the retention time for 1150 to 1300° C. is less than 1.5 hours, a load applied to a rolling mill becomes excessively heavy during finish rolling. On the other hand, if the heating temperature is more than 1300° C., or the retention time for 1150 to 1300° C. is more than 5.0 hours, a unit requirement becomes excessively high, increasing a production cost.

When the heating temperature is 1150 to 1300° C. and the retention time for 1150 to 1300° C. is 1.5 to 5.0 hours in the finish-rolling process, V carbides and the like and complex V carbides and the like in the starting material are sufficiently dissolved.

The steel material subjected to the finish rolling is cooled at a cooling rate not more than that of allowing cooling to be produced into the steel material according to the present embodiment. Preferably, an average cooling rate CR for a temperature range in which a temperature of the steel material subjected to the finish rolling is 800° C. to 500° C. is set at 0.1 to 5.0° C./sec. When the temperature of the steel material is 800 to 500° C., phase transformation from austenite into ferrite, pearlite, or bainite occurs. When the average cooling rate CR for the temperature range in which the temperature of the steel material is 800° C. to 500° C. is 0.1 to 5.0° C./sec, the microstructure becomes a structure in which a total area fraction of ferrite and pearlite is 10.0% or more, and the balance is bainite.

The average cooling rate CR is measured by the following method. The steel material subjected to the finish rolling is conveyed downstream on a conveyance line. On the conveyance line, a plurality of thermometers are arranged along the conveyance line, with which the temperature of the steel material can be measured at the respective positions of the conveyance line. Based on results of measurement by the plurality of thermometers arranged along the conveyance line, a time taken by the temperature of the steel material to decrease from 800° C. to 500° C. is determined, and then the average cooling rate CR (° C./sec) is determined. The average cooling rate CR can be adjusted by, for example, arranging a plurality of slow cooling covers spaced from one another on the conveyance line.

Through the above production process, the steel material according to the present embodiment having the above-described configuration can be produced.

[Carbonitrided Bearing Component]

The steel material according to the present embodiment is used for a carbonitrided bearing component. The carbonitrided bearing component means a bearing component subjected to carbonitriding treatment. Carbonitriding treatment herein means a treatment in which carbonitriding and quenching, and tempering are performed.

A bearing component means a component of a rolling bearing. Examples of the bearing component include a race, a bearing washer, and a rolling element. The race may be an inner race or an outer race, and the bearing washer may be a shaft washer, a housing washer, a central washer, or an aligning housing washer. The race and the bearing washer are not limited to a specific race and a specific bearing washer as long as the race and the bearing washer are members each having a raceway. The rolling element may be a ball or a roller. Examples of the roller include a cylindrical roller, a long cylindrical roller, a needle roller, a tapered roller, and a convex roller.

A carbonitrided bearing component includes a carbonitrided layer that is formed in its outer layer by the carbonitriding treatment and a core portion that is inner than the carbonitrided layer. A depth of the carbonitrided layer is not limited to a specific depth; however, an example of the depth from a surface of the carbonitrided layer is 0.2 mm to 5.0 mm. The core portion has the same chemical composition as the chemical composition of the steel material according to the present embodiment.

[Method for Producing Carbonitrided Bearing Component]

An example of a method for producing a carbonitrided bearing component having the above-described configuration is as follows. First, the steel material according to the present embodiment to be a starting material of the carbonitrided bearing component is worked into a predetermined shape to be produced into an intermediate product. A method for the working is, for example, hot forging or machining. The machining is, for example, cutting machining. It suffices to perform the hot forging under well-known conditions. In a hot-forging process, a heating temperature of the steel material is, for example, 1000 to 1300° C. The intermediate product subjected to the hot forging is allowed to cool. After the hot forging, a machining process may be performed. The steel material or the intermediate product before subjected to the machining process may be subjected to well-known spheroidizing annealing. For machining, it is preferable that the steel material (intermediate product) have a high machinability. The above-described steel material according to the present embodiment is excellent in machinability. Therefore, the steel material according to the present embodiment is suitable for the machining process.

The produced intermediate product is subjected to carbonitriding treatment to be produced into the carbonitrided bearing component. The carbonitriding treatment includes carbonitriding and quenching, and tempering, as described above. In the carbonitriding and quenching, the intermediate product is heated to and retained at a carbonitriding temperature not less than an $A_{c3}$ transformation point in a well-known atmospheric gas that contains a well-known converted carburizing gas and ammonia gas, and then subjected to rapid cooling. In tempering treatment, the intermediate product subjected to the carbonitriding and quenching is retained at a tempering temperature of 100 to 500° C. for a predetermined time. Here, the converted carburizing gas means a well-known endothermic converted gas (RX gas). The RX gas is a gas made by mixing a hydrocarbon gas such as butane and propane with air and passing them through a heated Ni catalyst to cause them to react with each other; the RX gas is a gaseous mixture containing CO, $H_2$, $N_2$, and the like.

A surface concentration of C, a surface concentration of N, and a surface hardness of the carbonitrided bearing component can be adjusted by controlling conditions for the carbonitriding and quenching, and the tempering. Specifically, the surface concentration of C and the surface concentration of N are adjusted by controlling a carbon potential, a concentration of ammonia, and the like in the atmospheric gas in the carbonitriding and quenching.

Specifically, the surface concentration of C of the carbonitrided bearing component is adjusted mainly by the carbon potential of the carbonitriding and quenching, the carbonitriding temperature, and the retention time at the carbonitriding temperature. The surface concentration of C is increased with an increase in the carbon potential, an increase in the carbonitriding temperature, and an increase in the retention time at the carbonitriding temperature. In contrast, the surface concentration of C is decreased with a decrease in the carbon potential, a decrease in the carbonitriding temperature, and a decrease in the retention time at the carbonitriding temperature.

The surface concentration of N is adjusted mainly by the concentration of ammonia of the carbonitriding and quenching, the carbonitriding temperature, and the retention time at the carbonitriding temperature. The surface concentration of N is increased with an increase in the concentration of ammonia, a decrease in the carbonitriding temperature, and an increase in the retention time at the carbonitriding temperature. On the other hand, the surface concentration of N is decreased with a decrease in the concentration of ammonia, an increase in the carbonitriding temperature, and a decrease in the retention time at the carbonitriding temperature.

Surface hardness relates to the surface concentration of C and the surface concentration of N. Specifically, the surface hardness is increased with increases in the surface concentration of C and the surface concentration of N. On the other hand, the surface hardness is decreased with decreases in the surface concentration of C and the surface concentration of N.

A surface hardness increased by the carbonitriding and quenching can be decreased by tempering. A surface hardness of a carbonitrided bearing component is decreased by increasing the tempering temperature and lengthening the retention time at the tempering temperature. A surface hardness of a carbonitrided bearing component can be kept high by decreasing the tempering temperature and shortening the retention time at the tempering temperature.

Preferable conditions for the carbonitriding and quenching are as follows.

Carbon potential CP in atmospheric gas: 0.70 to 1.40

When a carbon potential CP in the atmospheric gas is 0.70 or more, the concentration of C of the surface of the carbonitrided bearing component is sufficiently increased: for example, the surface concentration of C is increased to, in mass %, 0.70% or more. In this case, carbo-nitrides are produced in a sufficient amount by the carbonitriding treatment, significantly increasing wear resistance. In addition, when the carbon potential CP is 1.40 or less, the surface concentration of C becomes 1.20% or less, and production of coarse carbo-nitrides is sufficiently prevented or reduced. Therefore, a preferable carbon potential CP is to be 0.70 to 1.40.

Concentration of ammonia with respect to flow of converted carburizing gas in atmosphere: 1.00 to 6.00%

A concentration of ammonia with respect to a flow of the converted carburizing gas in the atmosphere means a concentration of ammonia (mass %) with respect to the flow of the converted carburizing gas assumed to be 100%. When the concentration of ammonia with respect to the flow of the converted carburizing gas is 1.00% or more, the surface concentration of N of the carbonitrided bearing component is sufficiently increased, and the surface concentration of N becomes 0.15% or more. In this case, carbo-nitrides are produced in a sufficient amount by the carbonitriding treatment, significantly increasing wear resistance. In addition, when the concentration of ammonia with respect to the flow of the converted carburizing gas is 6.00% or less, the surface concentration of N of the carbonitrided bearing component becomes 0.60% or less. In this case, production of coarse carbo-nitrides is sufficiently prevented or reduced. Therefore, the concentration of ammonia with respect to the flow of the converted carburizing gas in the atmosphere is to be 1.00 to 6.00%.

Retention temperature in carbonitriding (carbonitriding temperature): 830 to 930° C.

Retention time at carbonitriding temperature: 30 to 100 minutes

If the carbonitriding temperature is excessively low, diffusion velocities of C and N become low. In this case, a treatment time necessary to obtain predetermined heat treatment properties is lengthened, increasing a production cost. On the other hand, if the carbonitriding temperature is excessively high, ammonia in the atmosphere decomposes, decreasing an amount of N that penetrates into the steel material. Moreover, solubilities of C and N penetrating into a matrix of the steel material are increased. As a result, carbo-nitrides are not produced in a sufficient amount, decreasing a wear resistance of the carbonitrided bearing component. Thus, the carbonitriding temperature is to be 830 to 930° C.

The retention time at the carbonitriding temperature is not limited to a specific time as long as a sufficient concentration of C and a sufficient concentration of N are kept at the surface of the steel material. The retention time is, for example, 30 to 100 minutes.

Quenching temperature: 830 to 930° C.

An excessively low quenching temperature fails to dissolve C sufficiently in steel, decreasing a hardness of the steel. On the other hand, an excessively high quenching temperature causes grains to coarsen, making coarse carbo-nitrides liable to precipitate along grain boundaries. Thus, the quenching temperature is to be 830 to 930° C. Note that the carbonitriding temperature may also be used as the carburizing-quenching temperature.

Preferable conditions for the tempering are as follows.

Tempering temperature: 150 to 200° C.

Retention time at tempering temperature: 30 to 240 minutes

An excessively low tempering temperature fails to provide a sufficient toughness of the core portion of the carbonitrided bearing component. On the other hand, an excessively high tempering temperature decreases a surface hardness of the carbonitrided bearing component, decreasing a wear resistance of the carbonitrided bearing component. Thus, the tempering temperature is to be 150 to 200° C.

An excessively short retention time at the tempering temperature fails to provide a sufficient toughness of the core portion. On the other hand, an excessively long retention time decreases surface hardness, decreasing a wear resistance of the carbonitrided bearing component. Thus, the retention time at the tempering temperature is to be 30 to 240 minutes.

[Concentration of C, Concentration of N, and Rockwell Hardness C Scale of Surface of Carbonitrided Bearing Component]

A concentration of C, a concentration of N, and a Rockwell hardness C scale HRC of a surface of the carbonitrided bearing component produced through the above production process are as follows.

Concentration of C of surface: 0.70 to 1.20% in mass %

A concentration of C of a surface of the carbonitrided bearing component produced by subjecting the steel material according to the present embodiment to carbonitriding and quenching and tempering under the above-described conditions is 0.7 to 1.2%. If the concentration of C of the surface is excessively low, surface hardness becomes excessively low, and wear resistance is decreased. On the other hand, if the concentration of C of the surface is excessively high, coarse carbides, coarse carbo-nitrides, and the like are produced, decreasing a flaking life under a hydrogen-generating environment. When the concentration of C of the surface is 0.70 to 1.20%, the carbonitrided bearing component is excellent in wear resistance and flaking life under a hydrogen-generating environment. A lower limit of the concentration of C of the surface is preferably 0.75%, and more preferably 0.80%. An upper limit of the concentration of C of the surface is preferably 1.10%, more preferably 1.05%, and still more preferably 1.00%.

Concentration of N of surface: 0.15 to 0.60% in mass %

A concentration of N of a surface of the carbonitrided bearing component produced by subjecting the steel material according to the present embodiment to carbonitriding and quenching and tempering under the above-described conditions is 0.15 to 0.60%. If the concentration of N of the surface is excessively low, production of fine carbo-nitrides is prevented or reduced, and thus a wear resistance of the carbonitrided bearing component is decreased. On the other hand, if the concentration of N of the surface is excessively high, retained austenite is produced in an excess amount. This case results in a decrease in surface hardness of the carbonitrided bearing component, decreasing a flaking life under a hydrogen-generating environment. When the concentration of N of the surface is 0.15 to 0.60%, the carbonitrided bearing component is excellent in wear resistance and flaking life under a hydrogen-generating environment. A lower limit of the concentration of N of the surface is preferably 0.18%, more preferably 0.20%. An upper limit of the concentration of N of the surface is preferably 0.58%, more preferably 0.56%, and still more preferably 0.54%.

The concentration of C and the concentration of N of the surface are measured by the following method. An electron probe micro analyzer (EPMA) is used to measure concentrations of C and concentrations of N at a freely-selected surface position of the carbonitrided bearing component, from the surface down to a depth of 100 μm with a 1.0-μm pitch. An arithmetic mean value of the measured concentrations of C is defined as a surface concentration of C (mass %). Similarly, an arithmetic mean value of the measured concentrations of N is defined as a surface concentration of N (mass %).

Rockwell hardness C scale HRC of surface: 58 to 65

The Rockwell hardness C scale HRC of the surface of the carbonitrided bearing component is to be 58 to 65. If the Rockwell hardness C scale HRC of the surface is less than 58, a wear resistance of the carbonitrided bearing component is decreased. On the other hand, if the Rockwell hardness C scale of the surface is more than 65, it becomes easy for fine cracks to occur and propagate, and a flaking life under a hydrogen-generating environment is decreased. When the Rockwell hardness C scale of the surface is 58 to 65, an excellent wear resistance and an excellent flaking life under a hydrogen-generating environment are obtained. A lower limit of the Rockwell hardness C scale of the surface is preferably 59. An upper limit of the Rockwell hardness C scale of the surface is preferably 64.

A Rockwell hardness C scale HRC of a carbonitrided bearing component is measured by the following method. On a surface of the carbonitrided bearing component, four freely-selected measurement positions are specified. At the four specified measurement positions, the Rockwell hardness test using C scale is conducted in conformity to JIS Z 2245 (2011). An arithmetic mean value of four obtained Rockwell hardness C scale HRC is defined as the Rockwell hardness C scale HRC of the surface.

Through the above production process, the above-described steel material to be a starting material of a carbonitrided bearing component and the carbonitrided bearing component are produced. The present invention will be described below specifically with EXAMPLE.

Example

Molten steels having various chemical compositions shown in Table 1 were produced.

TABLE 1

| Steel type | Chemical composition (in mass %, Balance being Fe and impurities) | | | | | | | | | | |
|---|---|---|---|---|---|---|---|---|---|---|---|
|  | C | Si | Mn | P | S | Cr | Mo | V | Al | N | O |
| A | 0.18 | 0.15 | 0.39 | 0.010 | 0.004 | 0.90 | 0.24 | 0.31 | 0.029 | 0.0065 | 0.0008 |
| B | 0.21 | 0.10 | 0.55 | 0.006 | 0.003 | 1.25 | 0.22 | 0.25 | 0.025 | 0.0075 | 0.0012 |
| C | 0.28 | 0.22 | 0.42 | 0.009 | 0.004 | 1.19 | 0.25 | 0.32 | 0.015 | 0.0088 | 0.0010 |
| D | 0.43 | 0.06 | 0.25 | 0.006 | 0.005 | 0.91 | 0.19 | 0.24 | 0.032 | 0.0074 | 0.0009 |
| E | 0.39 | 0.12 | 0.36 | 0.005 | 0.004 | 0.89 | 0.18 | 0.24 | 0.039 | 0.0072 | 0.0008 |
| F | 0.22 | 0.23 | 0.59 | 0.004 | 0.004 | 1.18 | 0.20 | 0.27 | 0.034 | 0.0070 | 0.0011 |
| G | 0.41 | 0.09 | 0.38 | 0.006 | 0.003 | 0.91 | 0.21 | 0.28 | 0.038 | 0.0120 | 0.0008 |
| H | 0.17 | 0.15 | 0.46 | 0.012 | 0.004 | 1.18 | 0.23 | 0.32 | 0.041 | 0.0081 | 0.0006 |
| I | 0.25 | 0.24 | 0.32 | 0.014 | 0.003 | 1.31 | 0.19 | 0.25 | 0.044 | 0.0165 | 0.0013 |
| J | 0.16 | 0.09 | 0.56 | 0.008 | 0.004 | 1.37 | 0.28 | 0.39 | 0.036 | 0.0062 | 0.0006 |
| K | 0.38 | 0.08 | 0.18 | 0.013 | 0.004 | 1.35 | 0.18 | 0.24 | 0.036 | 0.0110 | 0.0006 |
| L | 0.20 | 0.16 | 0.65 | 0.004 | 0.003 | 1.23 | 0.25 | 0.30 | 0.031 | 0.0085 | 0.0008 |
| M | 0.39 | 0.13 | 0.42 | 0.008 | 0.004 | 1.06 | 0.15 | 0.25 | 0.028 | 0.0066 | 0.0009 |
| N | 0.18 | 0.08 | 0.47 | 0.006 | 0.004 | 0.84 | 0.35 | 0.24 | 0.033 | 0.0075 | 0.0006 |
| O | 0.38 | 0.07 | 0.35 | 0.007 | 0.003 | 1.21 | 0.21 | 0.21 | 0.041 | 0.0105 | 0.0008 |
| P | 0.18 | 0.12 | 0.49 | 0.009 | 0.004 | 0.95 | 0.30 | 0.42 | 0.037 | 0.0100 | 0.0007 |
| Q | 0.28 | 0.23 | 0.38 | 0.006 | 0.003 | 0.81 | 0.18 | 0.24 | 0.025 | 0.0088 | 0.0007 |
| R | 0.16 | 0.08 | 0.44 | 0.007 | 0.004 | 1.48 | 0.29 | 0.39 | 0.022 | 0.0069 | 0.0009 |
| S | 0.16 | 0.08 | 0.35 | 0.008 | 0.003 | 0.87 | 0.18 | 0.25 | 0.034 | 0.0084 | 0.0011 |
| T | 0.44 | 0.15 | 0.52 | 0.005 | 0.004 | 1.05 | 0.24 | 0.33 | 0.029 | 0.0068 | 0.0012 |
| U | 0.28 | 0.05 | 0.42 | 0.008 | 0.003 | 0.89 | 0.19 | 0.39 | 0.034 | 0.0071 | 0.0008 |
| V | 0.19 | 0.09 | 0.58 | 0.006 | 0.004 | 1.35 | 0.18 | 0.34 | 0.010 | 0.0095 | 0.0010 |
| W | 0.20 | 0.29 | 0.59 | 0.012 | 0.003 | 1.19 | 0.25 | 0.30 | 0.028 | 0.0071 | 0.0011 |
| X | 0.21 | 0.18 | 0.48 | 0.014 | 0.004 | 1.16 | 0.29 | 0.30 | 0.032 | 0.0120 | 0.0008 |
| AA | 0.19 | 0.14 | 0.39 | 0.011 | 0.004 | 0.91 | 0.26 | 0.32 | 0.028 | 0.0068 | 0.0008 |
| BB | 0.22 | 0.11 | 0.54 | 0.008 | 0.003 | 1.26 | 0.23 | 0.24 | 0.024 | 0.0077 | 0.0012 |
| Y | 1.02 | 0.20 | 0.41 | 0.012 | 0.006 | 1.41 | 0.03 |  | 0.015 | 0.0050 | 0.0011 |

| Steel type | Chemical composition (in mass %, Balance being Fe and impurities) | | | | | | F1 | F2 | F3 | F4 |
|---|---|---|---|---|---|---|---|---|---|---|
|  | Cu | Ni | B | Nb | Ti | Ca |  |  |  |  |
| A |  |  |  |  |  |  | 1.85 | 2.21 | 0.77 | 2.46 |
| B |  |  |  |  |  |  | 1.71 | 2.63 | 0.88 | 2.57 |
| C |  |  |  |  |  |  | 2.02 | 2.79 | 0.78 | 2.93 |
| D | 0.09 |  |  |  |  |  | 1.52 | 2.59 | 0.79 | 3.62 |
| E |  | 0.12 |  |  |  |  | 1.51 | 2.65 | 0.75 | 2.85 |
| F |  |  | 0.0007 |  |  |  | 1.77 | 2.69 | 0.74 | 2.46 |
| G |  |  |  | 0.020 |  |  | 1.71 | 2.74 | 0.75 | 2.80 |
| H |  |  |  |  | 0.010 |  | 2.00 | 2.47 | 0.72 | 2.47 |
| I |  |  |  |  |  | 0.0005 | 1.73 | 2.58 | 0.76 | 2.92 |
| J |  |  | 0.0018 |  | 0.025 | 0.0008 | 2.42 | 2.79 | 0.72 | 2.83 |
| K |  |  |  |  |  |  | 1.69 | 2.74 | 0.75 | 4.02 |
| L |  |  |  |  |  |  | 1.94 | 2.79 | 0.83 | 2.44 |

TABLE 1-continued

| | | | | |
|---|---|---|---|---|
| M | 1.61 | 2.77 | 0.60 | 2.52 |
| N | 1.56 | 2.25 | 1.46 | 2.42 |
| O | 1.51 | 2.79 | 1.00 | 3.33 |
| P | 2.39 | 2.50 | 0.71 | 2.49 |
| Q | 1.48 | 2.30 | 0.75 | 2.46 |
| R | 2.46 | 2.77 | 0.74 | 3.72 |
| S | 1.55 | 1.94 | 0.72 | 2.55 |
| T | 2.00 | 3.18 | 0.73 | 2.61 |
| U | 2.19 | 2.49 | 0.49 | 2.53 |
| V | 2.14 | 2.73 | 0.53 | 2.67 |
| W | 1.93 | 2.75 | 0.83 | 2.10 |
| X | 1.93 | 2.64 | 0.97 | 2.30 |
| AA | 1.91 | 2.27 | 0.81 | 2.44 |
| BB | 1.68 | 2.66 | 0.96 | 2.47 |
| Y | — | — | — | — |

Blank fields seen in Table 1 each indicate that a content of a corresponding element fell below a detection limit of the element. A steel type Y included a chemical composition equivalent to that of SUJ2, a conventional steel material specified in JIS G 4805 (2008). In this EXAMPLE, the steel type Y will be referred to as a reference steel material for comparison. The molten steels shown in Table 1 were subjected to continuous casting to be produced into blooms. The blooms were subjected to the rough-rolling process. Specifically, the blooms were heated at heating temperatures (° C.) shown in Table 2. Retention times at the heating temperatures were all 3.0 to 3.5 hours.

TABLE 2

| Test No. | Steel type | Rough-rolling process Heating temperature (° C.) | Finish-rolling process Heating temperature (° C.) | Average cooling rate CR (° C./sec) | F + P total area fraction (%) | RA_γ (%) | Machinability Service life ratio | Machinability Evaluation | Toughness vE_20 (J/cm²) | Toughness σy (MPa) | Toughness Index | Evaluation | Wear resistance Surface concentration of C (%) | Wear resistance Surface concentration of N (%) | HRC | Average wear depth (µm) | Evaluation | Flaking life Surface concentration of C (%) | Flaking life Surface concentration of N (%) | HRC | Flaking life ratio | Evaluation | Overall evaluation | Remarks |
|---|---|---|---|---|---|---|---|---|---|---|---|---|---|---|---|---|---|---|---|---|---|---|---|---|
| 1 | A | 1270 | 1250 | 1.0 | 75.0 | 9.0 | 1.3 | E | 155 | 575 | 952 | E | 0.82 | 0.32 | 61 | 8 | E | 0.82 | 0.31 | 61 | 5.2 | E | E | Inventive |
| 2 | B | 1280 | 1240 | 1.0 | 40.0 | 5.0 | 0.9 | E | 118 | 620 | 999 | E | 0.82 | 0.30 | 59 | 6 | E | 0.81 | 0.30 | 60 | 3.1 | E | E | Inventive |
| 3 | C | 1260 | 1200 | 0.8 | 32.0 | 6.0 | 0.9 | E | 78 | 670 | 1036 | E | 0.81 | 0.31 | 60 | 3 | E | 0.81 | 0.30 | 60 | 4.4 | E | E | Inventive |
| 4 | D | 1280 | 1250 | 1.0 | 45.0 | 8.0 | 1.1 | E | 35 | 800 | 1142 | E | 0.81 | 0.29 | 61 | 4 | E | 0.81 | 0.30 | 61 | 6.2 | E | E | Inventive |
| 5 | E | 1270 | 1260 | 1.0 | 40.0 | 6.0 | 0.9 | E | 34 | 780 | 1110 | E | 0.80 | 0.30 | 60 | 5 | E | 0.80 | 0.29 | 60 | 3.6 | E | E | Inventive |
| 6 | F | 1240 | 1250 | 1.0 | 35.0 | 5.0 | 0.9 | E | 115 | 640 | 1029 | E | 0.81 | 0.31 | 60 | 7 | E | 0.80 | 0.31 | 60 | 2.5 | E | E | Inventive |
| 7 | G | 1270 | 1220 | 0.4 | 45.0 | 5.0 | 0.9 | E | 32 | 795 | 1124 | E | 0.80 | 0.31 | 61 | 4 | E | 0.80 | 0.30 | 61 | 4.2 | E | E | Inventive |
| 8 | H | 1250 | 1250 | 1.0 | 50.0 | 8.0 | 1.1 | E | 152 | 580 | 959 | E | 0.80 | 0.32 | 60 | 6 | E | 0.80 | 0.31 | 60 | 2.8 | E | E | Inventive |
| 9 | I | 1260 | 1220 | 0.6 | 45.0 | 7.0 | 1.0 | E | 92 | 665 | 1045 | E | 0.79 | 0.30 | 59 | 5 | E | 0.80 | 0.29 | 59 | 4.4 | E | E | Inventive |
| 10 | J | 1250 | 1200 | 0.2 | 55.0 | 5.0 | 0.9 | E | 161 | 575 | 956 | E | 0.80 | 0.28 | 61 | 9 | E | 0.80 | 0.30 | 60 | 4.9 | E | E | Inventive |
| 11 | K | 1290 | 1280 | 0.6 | 40.0 | 8.0 | 1.0 | E | 37 | 770 | 1105 | B | 0.80 | 0.29 | 60 | 6 | E | 0.80 | 0.30 | 61 | 1.6 | B | B | Comparative |
| 12 | L | 1190 | 1200 | 1.0 | 30.0 | 6.0 | 0.9 | E | 121 | 620 | 1002 | E | 0.79 | 0.31 | 60 | 7 | E | 0.79 | 0.32 | 60 | 1.5 | B | B | Comparative |
| 13 | M | 1270 | 1260 | 1.0 | 35.0 | 6.0 | 0.9 | E | 34 | 780 | 1110 | E | 0.81 | 0.31 | 59 | 20 | B | 0.81 | 0.30 | 60 | 1.3 | B | B | Comparative |
| 14 | N | 1240 | 1260 | 1.0 | 60.0 | 4.0 | 0.6 | B | 138 | 585 | 958 | E | 0.80 | 0.28 | 60 | 6 | E | 0.80 | 0.29 | 60 | 2.6 | E | B | Comparative |
| 15 | O | 1240 | 1200 | 0.8 | 30.0 | 6.0 | 0.9 | E | 37 | 780 | 1119 | E | 0.81 | 0.29 | 61 | 17 | B | 0.80 | 0.29 | 61 | 1.4 | B | B | Comparative |
| 16 | P | 1270 | 1220 | 1.0 | 45.0 | 17.0 | 1.1 | E | 95 | 585 | 922 | B | 0.80 | 0.28 | 60 | 7 | E | 0.81 | 0.28 | 61 | 1.3 | B | B | Comparative |
| 17 | Q | 1230 | 1210 | 1.0 | 60.0 | 9.0 | 1.2 | E | 78 | 700 | 1082 | E | 0.82 | 0.29 | 60 | 19 | B | 0.81 | 0.29 | 60 | 1.6 | E | B | Comparative |
| 18 | R | 1270 | 1260 | 0.6 | 40.0 | 19.0 | 0.9 | E | 142 | 550 | 903 | B | 0.80 | 0.30 | 61 | 6 | E | 0.80 | 0.29 | 61 | 1.8 | E | B | Comparative |
| 19 | S | 1270 | 1240 | 1.0 | 75.0 | 9.0 | 1.3 | E | 170 | 572 | 956 | E | 0.81 | 0.29 | 60 | 7 | E | 0.81 | 0.30 | 60 | 1.3 | E | B | Comparative |
| 20 | T | 1250 | 1200 | 0.8 | 3.0 | 4.0 | 0.6 | B | 32 | 805 | 1138 | E | 0.81 | 0.30 | 61 | 6 | E | 0.81 | 0.31 | 61 | 3.4 | E | B | Comparative |
| 21 | U | 1260 | 1250 | 1.0 | 50.0 | 7.0 | 1.1 | E | 78 | 690 | 1067 | E | 0.82 | 0.29 | 60 | 16 | B | 0.82 | 0.30 | 60 | 1.1 | B | B | Comparative |
| 22 | V | 1250 | 1200 | 1.0 | 30.0 | 6.0 | 1.0 | E | 128 | 600 | 975 | E | 0.81 | 0.31 | 59 | 18 | B | 0.80 | 0.31 | 59 | 1.2 | B | B | Comparative |
| 23 | W | 1270 | 1260 | 1.0 | 35.0 | 6.0 | 0.9 | E | 125 | 610 | 989 | E | 0.80 | 0.31 | 60 | 7 | E | 0.81 | 0.30 | 61 | 1.0 | B | B | Comparative |
| 24 | X | 1260 | 1240 | 1.0 | 38.0 | 5.0 | 0.9 | E | 117 | 620 | 998 | E | 0.81 | 0.29 | 60 | 7 | E | 0.81 | 0.30 | 60 | 1.1 | B | B | Comparative |
| 25 | AA | 1100 | 1190 | 1.0 | 71.0 | 22.0 | 1.1 | E | 138 | 572 | 935 | B | 0.82 | 0.30 | 60 | 6 | E | 0.81 | 0.31 | 60 | 1.5 | E | B | Comparative |
| 26 | BB | 1260 | 1100 | 1.0 | 39.0 | 19.0 | 1.0 | E | 99 | 599 | 947 | B | 0.82 | 0.29 | 61 | 7 | E | 0.81 | 0.30 | 61 | 1.6 | E | B | Comparative |
| 27 | AA | 1280 | 1250 | 10.0 | 0.0 | 4.0 | 0.5 | B | 157 | 577 | 956 | E | 0.81 | 0.31 | 61 | 8 | E | 0.81 | 0.31 | 59 | 4.9 | E | B | Comparative |

The heated blooms were subjected to blooming to be produced into billets each having a rectangular transverse section of 160 mm×160 mm. In addition, the billets were subjected to the finish-rolling process. In the finish-rolling process, the billets were heated to heating temperatures (° C.) shown in Table 2. Retention times at the heating temperatures were all 2.5 to 3.0 hours. The heated billets were subjected to hot rolling to be produced into steel bars each having a diameter of 60 mm. The produced billets were cooled at average cooling rates CR (° C./sec) shown in Table 2. Through the above processes, the steel bars being steel materials were produced. From the reference steel material for comparison, a steel bar having a diameter of 60 mm was produced under the same production conditions. For the reference steel material for comparison, in the rough-rolling process, the heating temperature was 1250° C., and the retention time was 3.0 hours. In the finish-rolling process, the heating temperature was 1250° C., and the retention time was 2.5 hours. The average cooling rate CR was 1.0° C./sec.

[Evaluation Tests]

The produced steel materials (steel bars) were subjected to a microstructure observation test, an in-residue V-content proportion $RA_V$ measurement test, a machinability evaluation test, a toughness evaluation test, a wear-resistance evaluation test, and a flaking-life evaluation test under a hydrogen-generating environment.

[Microstructure Observation Test]

A sample was taken from an R/2 position of a cross section of a steel material (steel bar) of each test number that was perpendicular to a longitudinal direction (axial direction) of the steel material (transverse section). Of surfaces of the sample taken, a surface equivalent to the transverse section was determined as an observation surface. The observation surface was subjected to mirror polish and then etched with 2% nitric acid-alcohol (Nital etchant). The etched observation surface was observed under an optical microscope with 500× magnification, and photographic images of freely-selected 20 visual fields on the etched observation surface were created. A size of each of the visual fields was set at 100 μm×100 μm.

In each visual field, phases (ferrite, pearlite, and bainite) were identified based on their contrasts. Of the identified phases, a total area of ferrite ($\mu m^2$) and a total area of pearlite ($\mu m^2$) were determined in each visual field. A proportion of a summed area of total areas of ferrite and total areas of pearlite in all the visual fields to a total area of all the visual fields was defined as a total area fraction (%) of ferrite and pearlite. The total area fraction (%) of ferrite and pearlite was determined as a value obtained by rounding off the total area fraction (%) of ferrite and pearlite to the second decimal place. Note that, in each test number, its microstructure other than ferrite and pearlite was bainite (excluding inclusions and precipitates). A total area fraction of ferrite and pearlite of each test number is shown in the column "F+P total area fraction" in Table 2.

[In-Residue V-Content Proportion $RA_V$ Measurement Test]

From an R/2 position of a cross section of the steel material (steel bar) of each test number that was perpendicular to a longitudinal direction (axial direction) of the steel material (transverse section), three cylindrical specimens each having a diameter of 6 mm and a length of 50 mm were taken. A surface of each of the cylindrical specimens taken was subjected to preparatory electropolishing to be polished by about 50 μm, by which a new surface was obtained. The specimens subjected to the electropolishing were electrolyzed with an electrolyte (10% acetylacetone+ 1% tetraammonium+methanol). After the electrolysis, residues were captured by passing the electrolyte through a 0.2-μm filter. The obtained residues were subjected to acid decomposition, and inductively coupled plasma (ICP) optical emission spectrometry was performed to determine the content of V in the electrolytic extraction residue, by mass %, with respect to the steel material (base metal) assumed to be 100 mass %. An arithmetic mean value of contents of V in electrolytic extraction residue of the cylindrical specimens (i.e., an arithmetic mean value of three contents of V) was defined as a content of V in the electrolytic extraction residue of the steel material, $[V]_R$. The content of V in the electrolytic extraction residue, $[V]_R$, was determined as a value obtained by rounding off the above-described arithmetic mean value to the second decimal place. Using the content of V in the chemical composition of the steel material, $[V]_C$, and the content of V in the electrolytic extraction residue, $[V]_R$, obtained by the above-described measurement, the in-residue V-content proportion $RA_V$ (%) was determined by Formula (A). The in-residue V-content proportion $RA_V$ was determined as a value obtained by rounding off the in-residue V-content proportion $RA_V$ to the second decimal place.

$$RA_V = [V]_R/[V]_C \times 100 \quad (A)$$

Obtained in-residue V-content proportions $RA_V$ (%) are shown in the column "$RA_V$" in Table 2.

[Machinability Evaluation Test]

Straight turning was performed on the steel material of each test number (steel bar having a diameter of 60 mm) to evaluate its service life. Specifically, the straight turning was performed on the steel bar of each test number under the following conditions. A cutting tool used was made of a hard metal equivalent to P10 specified in JIS B 4053 (2013). A cutting speed was set at 150 m/min, a feed rate was set at 0.15 min/rev, and a depth of cut was set at 1.0 mm. Note that no lubricant was used in the turning.

The straight turning was performed under the above-described cutting conditions, and a time taken for a flank wear width of a cutting tool to be 0.2 mm was defined as service life (Hr). A service life of the reference steel material for comparison was used as a reference, and a service life ratio of each test number was determined by the following formula.

Service life ratio=Service life (Hr) of each test number/Service life (Hr) of reference steel material for comparison When an obtained service life ratio was 0.8 or more, the steel material was determined to be excellent in machinability (shown as "E" (Excellent) in the column of machinability evaluation in Table 2). In contrast, when the service life ratio was less than 0.8, the steel material was determined to be low in machinability (shown as "B" (Bad) in the column of machinability evaluation in Table 2).

[Toughness Evaluation Test]

The toughness evaluation test was conducted by the following method. Machining (straight turning) was performed on the steel bar of each test number to produce an intermediate product (steel bar) having a diameter of 40 mm. The intermediate product subjected to the machining was subjected to quenching and tempering in a heating pattern illustrated in FIG. 2, which simulated carbonitriding treatment (simulated carbonitriding treatment). Referring to FIG. 2, in quenching treatment in the simulated carbonitriding treatment, its quenching temperature was set at 900° C., and its retention time was set at 60 minutes. After a lapse of the retention time, the intermediate product (steel bar) was subjected to oil quenching (shown as "OQ" in the drawing). In tempering treatment, its tempering temperature was set at 180° C., and its retention time was set at 120 minutes. After a lapse of the retention time, the intermediate product (steel bar) was subjected to air cooling (shown as "AC" in the drawing). The steel bar subjected to the above-described simulated carbonitriding treatment was equivalent to the core portion of the carbonitrided bearing component.

From an R/2 position of the steel bar subjected to the above-described simulated carbonitriding treatment (quenching and tempering), a Charpy specimen having a V notch was taken. The Charpy specimen was subjected to the Charpy test conforming to JIS Z 2242 (2009) at normal temperature (20° C.±15° C.). An absorbed energy resulting from the test was divided by an original cross-sectional area of a notch portion (a cross-sectional area of the notch portion of the specimen before the test), by which an impact value $vE_{20}$ (J/cm$^2$) was determined. Obtained impact values $vE_{20}$ are shown in the column "$vE_{20}$" in Table 2.

In addition, from the steel material (steel bar) subjected to the above-described simulated carbonitriding treatment (quenching and tempering), a bar tensile specimen of No. 4 test coupon conforming to JIS Z 2241 (2011) was taken. This specimen was subjected to the tensile test conforming to TIS Z 2241 (2011) in the air at normal temperature (20° C.±15° C.), and from an obtained stress-strain curve, a 0.2% offset yield stress σy (MPa) was determined. Obtained 0.2% offset yield stresses ay are shown in the column "σy" in Table 2.

An obtained Charpy impact value $vE_{20}$ (J/cm$^2$) and a 0.2% yield stress σy (MPa) were used to determine Index, a toughness evaluation index, by the following formula:

$$\text{Index} = \sigma y \times (vE_{20})^{0.1}$$

Obtained Indexes are shown in the column "Index" in Table 2. It is required that the above-described Index of a carbonitrided bearing component be 950 or more. Therefore, in the toughness evaluation test, when a carbonitrided bearing component showed an Index of 950 or more, the carbonitrided bearing component was determined to be excellent in toughness (shown as the mark "E" in the column of toughness evaluation in Table 2). In contrast, when the carbonitrided bearing component showed an Index of less than 950, the carbonitrided bearing component was determined to be low in toughness (shown as the mark "B" in the column of toughness evaluation in Table 2).

[Wear-Resistance Evaluation Test]

The wear-resistance evaluation test was conducted by the following method. From the steel bar having a diameter of 60 mm, an intermediate product illustrated in FIG. 3 was fabricated by machining. FIG. 3 is a side view of the intermediate product. Numeric values in FIG. 3 indicate dimensions (mm) of corresponding portions of the intermediate product. In FIG. 3, numeric values accompanied with "φ" indicate diameters (mm).

Figure 4:
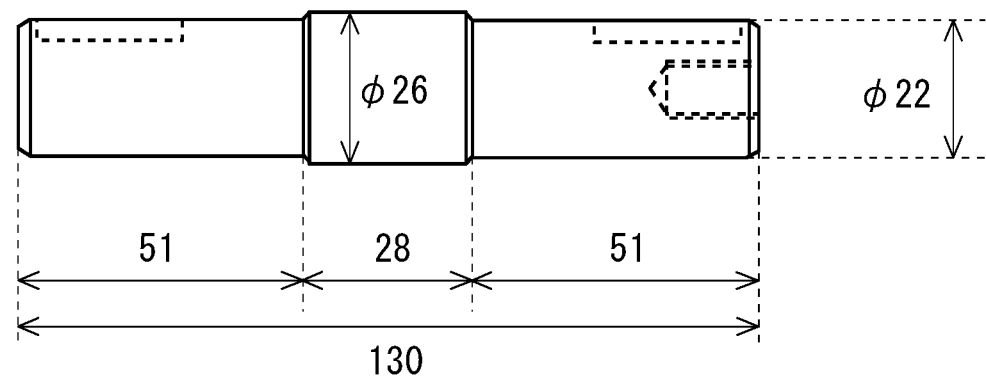
FIG. 4 is a side view of a small roller specimen used in a roller-pitting test in EXAMPLE.

The intermediate product was subjected to carbonitriding treatment (carbonitriding and quenching, and tempering) to be fabricated into a small roller specimen illustrated in FIG. 4 that simulated the carbonitrided bearing component. At this point, conditions for the carbonitriding and quenching, and the tempering were adjusted so that the small roller specimens each had a surface concentration of C of 0.80%, a surface concentration of N of 0.30%, and a surface hardness of 60.0 in Rockwell hardness C scale HRC. Specifically, the carbonitriding and quenching treatment was performed with carbon potentials CP, concentrations of ammonia with respect to the converted carburizing gas in the atmosphere, heating temperatures (in this EXAMPLE, Heating temperature=Carbonitriding treatment temperature=Quenching temperature), and retention times (=Retention time at Carbonitriding treatment temperature+ Retention time at Quenching temperature) shown in Table 3, and oil quenching was used as the cooling method. The tempering treatment was performed at tempering temperatures and for retention times shown in Table 3, and after a lapse of each retention time, air cooling was performed. The intermediate product subjected to the carbonitriding and quenching, and the tempering was subjected to finish machining (cutting machining) to be produced into a small roller specimen having a shape illustrated in FIG. 4. FIG. 4 is a side view of the small roller specimen. Numeric values in FIG. 4 indicate dimensions (mm) of corresponding portions of the specimen. In FIG. 4, numeric values accompanied with "φ" indicate diameters (mm).

TABLE 3

| | | Carbonitriding and quenching | | | Tempering | |
| --- | --- | --- | --- | --- | --- | --- |
| Test No. | Steel type | CP | Concentration of ammonia (%) | Heating temperature (° C.) | Retention time (min) | Tempering temperature (° C.) | Retention time (min) |
| 1 | A | 1.00 | 3.00 | 900 | 60 | 180 | 120 |
| 2 | B | 0.90 | 3.00 | 900 | 60 | 180 | 120 |
| 3 | C | 1.00 | 2.00 | 900 | 60 | 180 | 120 |
| 4 | D | 1.10 | 3.00 | 900 | 60 | 180 | 120 |
| 5 | E | 1.00 | 4.00 | 900 | 60 | 180 | 120 |
| 6 | F | 1.20 | 2.00 | 900 | 60 | 180 | 120 |
| 7 | G | 1.00 | 3.00 | 900 | 60 | 180 | 120 |
| 8 | H | 1.10 | 3.00 | 900 | 60 | 180 | 120 |
| 9 | I | 1.00 | 2.00 | 900 | 60 | 180 | 120 |
| 10 | J | 1.00 | 4.00 | 900 | 60 | 180 | 120 |
| 11 | K | 1.10 | 3.00 | 900 | 60 | 180 | 120 |
| 12 | L | 1.00 | 2.00 | 900 | 60 | 180 | 120 |
| 13 | M | 1.00 | 3.00 | 880 | 60 | 180 | 120 |
| 14 | N | 1.10 | 3.00 | 910 | 60 | 180 | 120 |
| 15 | O | 1.00 | 2.00 | 900 | 60 | 180 | 120 |
| 16 | P | 1.20 | 3.00 | 920 | 60 | 180 | 120 |
| 17 | Q | 1.00 | 3.00 | 900 | 60 | 180 | 120 |
| 18 | R | 1.00 | 2.00 | 900 | 60 | 180 | 120 |
| 19 | S | 1.10 | 3.00 | 900 | 60 | 180 | 120 |

TABLE 3-continued

| | | Carbonitriding and quenching | | | Tempering | |
|---|---|---|---|---|---|---|
| Test No. | Steel type | CP | Concentration of ammonia (%) | Heating temperature (° C.) | Retention time (min) | Tempering temperature (° C.) | Retention time (min) |
| 20 | T | 1.00 | 3.00 | 900 | 60 | 180 | 120 |
| 21 | U | 0.90 | 2.00 | 880 | 60 | 180 | 120 |
| 22 | V | 1.00 | 3.00 | 900 | 60 | 180 | 120 |
| 23 | W | 0.90 | 3.00 | 910 | 60 | 180 | 120 |
| 24 | X | 1.00 | 3.00 | 900 | 60 | 180 | 120 |
| 25 | AA | 1.00 | 3.00 | 900 | 60 | 180 | 120 |
| 26 | BB | 0.90 | 3.00 | 880 | 60 | 180 | 120 |
| 27 | AA | 1.00 | 3.00 | 900 | 60 | 180 | 120 |

Figure 5:
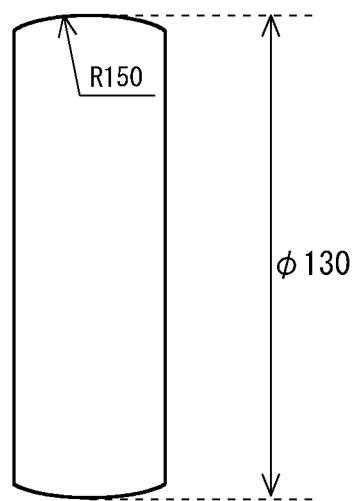
FIG. 5 is a front view of a large roller used in the roller-pitting test in EXAMPLE.

As the wear-resistance evaluation test, a roller-pitting test (two-roller rolling fatigue test) was conducted on the small roller specimen of each test number. Specifically, as illustrated in FIG. 5, a large roller having a diameter of 130 mm and a crowning radius of 150 mm was prepared. A starting material of the large roller had the chemical composition of the steel type Y, which is the reference steel material for comparison shown in Table 1. The starting material of the large roller was subjected to the quenching treatment and the tempering treatment. In the quenching treatment, its quenching temperature was set at 860° C., and its retention time at the quenching temperature was set at 60 minutes. After a lapse of the retention time, the starting material was subjected to oil quenching using oil at 80° C. The starting material subjected to the quenching treatment was subjected to the tempering treatment. In the tempering treatment, its tempering temperature was set at 180° C., and its retention time at the tempering temperature was set at 120 minutes. After the quenching treatment and the tempering treatment described above were performed, finish machining was performed to produce the large roller illustrated in FIG. 5.

Using the small roller specimen of each test number, the following roller-pitting test was conducted. Specifically, the small roller specimen and the large roller were arranged such that a central axis of the small roller specimen and a central axis of the large roller were parallel to each other. Then, the roller-pitting test was conducted under the following conditions. A surface of the large roller was pressed against a central portion of the small roller specimen (a portion having a diameter of 26 mm). A number of revolutions of the small roller specimen was set at 1500 rpm, rotation directions of the small roller specimen and the large roller at their contact portion were set to be the same, and a slip factor was set at 40%. Assuming that V1 (m/sec) denotes a rotation speed of the large roller, and V2 (m/sec) denotes a rotation speed of the small roller specimen, the slip factor (%) was determined by the following formula:

Slip factor=$(V2-V1)/V2 \times 100$

During the test, a contact stress between the small roller specimen and the large roller was set at 3.0 GPa. During the test, a lubricant (commercial automatic transmission fluid: ATF) was sprayed at 2 L/min on the contact portion between the large roller and the small roller specimen (a surface of a test part) in an opposite direction to the rotation directions under a condition of an oil temperature set at 80° C. A number of cycles was set at $2 \times 10^7$ maximum, and the test was finished after the number of cycles of $2 \times 10^7$.

Using the small roller specimen subjected to the wear-resistance evaluation test, an average wear depth (μm), a surface hardness (HRC), a surface concentration of C (mass %), and a surface concentration of N (mass %) were determined by the following methods.

[Average Wear Depth]

After the test, a roughness of a sliding portion of the specimen was measured. Specifically, a roughness profile was measured on a peripheral surface of the small roller specimen, at four spots provided with 90° pitches in a circumferential direction. A maximum depth of the roughness profile at the above four spots was defined as a wear depth, and an average of wear depths at these four spots was defined as an average wear depth (μm). Average wear depths are shown in the column "average wear depth" in Table 2. When an average wear depth was 10 μm or less, the carbonitrided bearing component was determined to be excellent in wear resistance (shown as "E" in the wear resistance evaluation in Table 2). In contrast, when an average wear depth was more than 10 μm, the carbonitrided bearing component was determined to be low in wear resistance (shown as "B" in the wear resistance evaluation in Table 2).

[Surface Hardness]

After the test, four measurement positions with 90° pitches in a circumferential direction were specified in a region on a surface of the test part of the small roller specimen other than the sliding portion (hereinafter, referred to as non-sliding portion). At the four specified measurement positions, the Rockwell hardness test using C scale was conducted in conformity to JIS Z 2245 (2011). An arithmetic mean value of Rockwell hardness C scale HRC at the measurement positions was defined as a Rockwell hardness C scale HRC of the surface. Obtained Rockwell hardness C scale are shown in the column "HRC" in Table 2.

[Surface Concentration of C and Surface Concentration of N]

The non-sliding portion of the test part of the small roller specimen was cut perpendicularly to an axial direction of the small roller specimen. A specimen including a cut section including a surface (peripheral surface) of the non-sliding portion was taken. The cut section was subjected to embedding-polish finishing. Then, an electron probe micro analyzer (EPMA) was used to measure a concentration of C and a concentration of N from the surface of the non-sliding portion down to a depth of 10 μm with a 0.1-μm pitch. Arithmetic mean values of measured values were defined as the surface concentration of C (mass %) and the surface concentration of N (mass %). Obtained surface concentrations of C (%) and surface concentrations of N (%) are shown in Table 2.

[Flaking Life Test Under Hydrogen-Generating Environment]

From the steel material (steel bar having a diameter of 60 mm) of each test number, a disk-shaped intermediate product having a diameter of 60 mm and a thickness of 5.5 mm was fabricated by machining. A thickness of the intermediate product (5.5 mm) was equivalent to a longitudinal direction of the steel bar. The intermediate product was subjected to carbonitriding treatment (carbonitriding and quenching, and tempering) to be produced into the carbonitrided bearing component. At this point, the carbonitriding and quenching, and the tempering were performed such that the each carbonitrided bearing component had a surface concentration of C of 0.80%, a surface concentration of N of 0.30%, and a surface Rockwell hardness C scale HRC of 60. Specifically, the carbonitriding and quenching treatment was performed with carbon potentials CP, concentrations of ammonia with respect to the converted carburizing gas in the atmosphere, heating temperatures (in this EXAMPLE, Heating temperature=Carbonitriding treatment temperature=Quenching temperature), and retention times (=Retention time at Carbonitriding treatment temperature+ Retention time at Quenching temperature) shown in Table 3, and oil quenching was used as the cooling method. The tempering treatment was performed at tempering temperatures and for retention times shown in Table 3, and after a lapse of each retention time, air cooling was performed. A surface of the obtained specimen was subjected to lapping to be produced into a rolling contact fatigue test specimen.

Note that, in the flaking life test under a hydrogen environment, the steel type Y being the reference steel material for comparison was subjected to, in place of the above-described carbonitriding treatment, the following quenching treatment and tempering treatment. Specifically, from a steel bar of the steel type Y having a diameter of 60 mm, a disk-shaped intermediate product having a diameter of 60 mm and a thickness of 5.5 mm was fabricated by machining. A thickness of the intermediate product (5.5 mm) was equivalent to a longitudinal direction of the steel bar. The intermediate product was subjected to quenching treatment. In the quenching treatment, its quenching temperature was set at 860° C., and its retention time at the quenching temperature was set at 60 minutes. After a lapse of the retention time, the intermediate product was subjected to oil quenching using oil at 80° C. Note that a furnace atmosphere in a heat treatment furnace used for the quenching treatment was formulated so that decarburization would not occur in the intermediate product subjected to the quenching treatment. The intermediate product subjected to the quenching treatment was subjected to the tempering treatment. In the tempering treatment, its tempering temperature was set at 180° C., and its retention time at the tempering temperature was set at 120 minutes. A surface of the obtained specimen was subjected to lapping to be produced into a rolling contact fatigue test specimen of the reference steel material for comparison.

Using the rolling contact fatigue test specimen of each test number and the rolling contact fatigue test specimen of the reference steel material for comparison (steel type Y), the following flaking life test was conducted. Specifically, to simulate a hydrogen-generating environment, the rolling contact fatigue test specimen was immersed in 20% ammonium thiocyanate ($NH_4SCN$) aqueous solution and subjected to hydrogen charging. Specifically, the hydrogen charging was performed with a temperature of the aqueous solution set at 50° C. and a time of the immersion set at 24 hours.

The rolling contact fatigue test specimen subjected to the hydrogen charging was subjected to the rolling contact fatigue test using a thrust rolling contact fatigue tester. In the test, a maximum contact interfacial pressure was set at 3.0 GPa, and a cycle rate of 1800 cycles per minute (cpm). A lubricant used for the test was turbine oil, and a steel ball used for the test was a thermally-refined material made of SUJ2 specified in JIS G 4805 (2008).

A result of the rolling contact fatigue test was plotted on Weibull probability paper, and an L10 life, which shows a 10% fracture probability, was defined as "flaking life". A ratio of a flaking life L10 of each test number to a flaking life L10 of the steel type Y was defined as flaking life ratio. In other words, the flaking life ratio was determined by the following formula:

$$\text{Flaking life ratio} = \text{Flaking life of each test number} / \text{Flaking life of steel type } Y$$

Obtained flaking life ratios are shown in the column "Flaking life ratio" in Table 2. When the obtained flaking life ratio was 2.0 or more, the carbonitrided bearing component was determined to be excellent in flaking life under a hydrogen-generating environment (shown as "E" in the column "Evaluation" of "Flaking life ratio" in Table 2). In contrast, when the flaking life ratio was less than 2.0, the carbonitrided bearing component was determined to be low in flaking life under a hydrogen-generating environment (shown as "B" in the column "Evaluation" of "Flaking life ratio" in Table 2).

[Test Results]

Table 2 shows results of the tests. Referring to Table 2, in chemical compositions of Test Nos. 1 to 10, contents of elements were appropriate, and F1 to F4 satisfied Formula (1) to Formula (4). In addition, their production conditions were also appropriate. Therefore, a total area fraction of ferrite and pearlite in its microstructure was 10.0% or more, the balance was bainite, and its in-residue V-content proportion $RA_V$ was 10.0% or less. As a result, the steel materials each showed a service life ratio of 0.8 or more, and thus the steel materials each provided an excellent machinability. In addition, after the simulated carbonitriding treatment, their Indexes were all 950 or more, and it was expected that core portions of their carbonitrided bearing components would each provide an excellent toughness. Moreover, in the wear-resistance evaluation test, their carbonitrided bearing components after carbonitriding treatment each showed a surface concentration of C of 0.70 to 1.20% and a surface concentration of N of 0.15 to 0.60%, and Rockwell hardness C scale HRC of surfaces of their carbonitrided bearing components were 58 to 65. Furthermore, in the wear-resistance evaluation test, their average wear depths were 10 μm or less, and thus their carbonitrided bearing components were excellent in wear resistance. Moreover, in the flaking life test under a hydrogen-generating environment, their carbonitrided bearing components after carbonitriding treatment each showed a surface concentration of C of 0.70 to 1.20% and a surface concentration of N of 0.15 to 0.60%, and Rockwell hardness C scale HRC of surfaces of their carbonitrided bearing components were 58 to 65. In addition, their flaking life ratios were 2.0 or more, and thus their flaking lives under a hydrogen-generating environment were excellent.

In contrast, in Test No. 11, its content of Mn was excessively low. As a result, its flaking life ratio was less than 2.0, and thus a flaking life under a hydrogen environment was low.

In Test No. 12, its content of Mn was excessively high. As a result, its flaking life ratio was less than 2.0, and thus a flaking life under a hydrogen environment was low.

In Test No. 13, its content of Mo was excessively low. As a result, in the wear-resistance evaluation test, its average wear depth was more than 10 μM, and thus its wear resistance was low. In addition, its flaking life ratio was less than 2.0, and thus a flaking life under a hydrogen environment was low.

In Test No. 14, its content of Mo was excessively high. As a result, a service life ratio of its steel material was less than 0.8, and thus the steel material was low in machinability.

In Test No. 15, its content of V was excessively low. As a result, in the wear-resistance evaluation test, its average wear depth was more than 10 and thus a wear resistance was low. In addition, its flaking life ratio was less than 2.0, and thus a flaking life under a hydrogen environment was low.

In Test No. 16, its content of V was excessively high. As a result, its in-residue V-content proportion $RA_V$ was more than 10.0%. Consequently, after the simulated carbonitriding treatment, its Index was less than 950, and thus a toughness was low. In addition, a flaking life ratio was less than 2.0, and thus its flaking life under a hydrogen environment was low.

In Test No. 17, although contents of elements in its chemical composition were appropriate, F1 was less than the lower limit of Formula (1). As a result, in the wear-resistance evaluation test, an average wear depth was more than 10 μm, and thus its wear resistance was low. In addition, a flaking life ratio was less than 2.0, and thus a flaking life under a hydrogen environment was low.

In Test No. 18, although contents of elements in its chemical composition were appropriate, F1 was more than the upper limit of Formula (1). As a result, its in-residue V-content proportion $RA_V$ was more than 10.0%. Consequently, after the simulated carbonitriding treatment, its Index was less than 950, and thus a toughness was low. In addition, a flaking life ratio was less than 2.0, and thus a flaking life under a hydrogen environment was low.

In Test No. 19, although contents of elements in its chemical composition were appropriate, F2 was less than the lower limit of Formula (2). As a result, a flaking life ratio was less than 2.0, and thus a flaking life under a hydrogen environment was low.

In Test No. 20, although contents of elements in its chemical composition were appropriate, F2 was more than the upper limit of Formula (2). As a result, its total area fraction of ferrite and pearlite was less than 10.0%. As a result, a service life ratio of its steel material was less than 0.8, and thus the steel material was low in machinability.

In Test Nos. 21 and 22, although contents of elements in their chemical compositions were appropriate, F3 was less than the lower limit of Formula (3). As a result, in the wear-resistance evaluation test, average wear depths were more than 10 μm, and thus wear resistances were low. In addition, flaking life ratios were less than 2.0, and thus flaking lives under a hydrogen environment were low.

In Test Nos. 23 and 24, although contents of elements in their chemical compositions were appropriate, F4 was less than the lower limit of Formula (4). As a result, flaking life ratios were less than 2.0, and thus flaking lives under a hydrogen environment were low.

In Test No. 25, contents of elements in its chemical composition were appropriate, and F1 to F4 satisfied Formula (1) to Formula (4). However, its heating temperature in the rough-rolling process was excessively low. As a result, its in-residue V-content proportion $RA_V$ was more than 10.0%. Therefore, after the simulated carbonitriding treatment, its Index was less than 950, and thus its toughness was low. In addition, its flaking life ratio was less than 2.0, and thus its flaking life under a hydrogen-generating environment was low.

In Test No. 26, contents of elements in its chemical composition were appropriate, and F1 to F4 satisfied Formula (1) to Formula (4). However, its heating temperature in the finish-rolling process was excessively low. As a result, its in-residue V-content proportion $RA_V$ was more than 10.0%. Therefore, after the simulated carbonitriding treatment, its Index was less than 950, and thus its toughness was low. In addition, its flaking life ratio was less than 2.0, and thus its flaking life under a hydrogen environment was low.

In Test No. 27, contents of elements in its chemical composition were appropriate, and F1 to F4 satisfied Formula (1) to Formula (4). However, its cooling rate CR in the finish-rolling process was excessively high. As a result, its total area fraction of ferrite and pearlite was less than 10.0%. As a result, a service life ratio of its steel material was less than 0.8, and thus the steel material was low in machinability.

An embodiment according to the present invention has been described above. However, the embodiment described above is merely an example of practicing the present invention. The present invention is therefore not limited to the embodiment described above, and the embodiment described above can be modified and practiced as appropriate without departing from the scope of the present invention.

The invention claimed is:

1. A steel material comprising a chemical composition consisting of, in mass %:
C: 0.15 to 0.45%,
Si: 0.50% or less,
Mn: 0.20 to 0.60%,
P: 0.015% or less,
S: 0.005% or less,
Cr: 0.80 to 1.50%,
Mo: 0.17 to 0.30%,
V: 0.24 to 0.40%,
Al: 0.005 to 0.100%,
N: 0.0300% or less,
O: 0.0015% or less,
Cu: 0 to 0.20%,
Ni: 0 to 0.20%,
B: 0 to 0.0050%,
Nb: 0 to 0.100%,
Ti: 0 to 0.100%,
Ca: 0 to 0.0010%, and
the balance being Fe and impurities, and
satisfying Formula (1) to Formula (4),
wherein, in its microstructure, a total area fraction of ferrite and pearlite is 10.0% or more, and the balance is bainite, and
a proportion of a content of V (mass %) in electrolytic extraction residue to the content of V (mass %) in the chemical composition is 10.0% or less:

$$1.50 < 0.4Cr + 0.4Mo + 4.5V < 2.45 \tag{1}$$

$$2.20 < 2.7C + 0.4Si + Mn + 0.45Ni + 0.8Cr + Mo + V < 2.80 \tag{2}$$

$$Mo/V \geq 0.58 \tag{3}$$

$$(Mo + V + Cr)/(Mn + 20P) \geq 2.40 \tag{4}$$

where each symbol of an element in Formula (1) to Formula (4) is to be substituted by a content of a corresponding element (mass %).

2. The steel material according to claim 1, wherein at least one of the elements selected from the group consisting of Cu, Ni, B, Nb and Ti is present in the following amount:

Cu: 0.01 to 0.20%,
Ni: 0.01 to 0.20%,
B: 0.0001 to 0.0050%,
Nb: 0.005 to 0.100%, and
Ti: 0.005 to 0.100%.

3. The steel material according to claim 1, wherein the Ca content is 0.0001 to 0.0010%.

4. The steel material according to claim 2, where the CA content is 0.0001 to 0.0010%.

* * * * *